US012649126B2

(12) United States Patent
Kim et al.

(10) Patent No.: US 12,649,126 B2
(45) Date of Patent: Jun. 9, 2026

(54) MICROFLUIDIC DIALYSIS MODULE AND CONTINUOUS PURIFICATION METHOD FOR DRUG CARRIERS OR BIOMEDICINE USING THE SAME

(71) Applicant: POSTECH RESEARCH AND BUSINESS DEVELOPMENT FOUNDATION, Pohang-si (KR)

(72) Inventors: Dong-Pyo Kim, Pohang-si (KR); Jeong-Un Joo, Pohang-si (KR); Gi-Su Na, Pohang-si (KR)

(73) Assignee: POSTECH RESEARCH AND BUSINESS DEVELOPMENT FOUNDATION, Pohang-si (KR)

( * ) Notice: Subject to any disclaimer, the term of this patent is extended or adjusted under 35 U.S.C. 154(b) by 183 days.

(21) Appl. No.: 18/737,498

(22) Filed: Jun. 7, 2024

(65) Prior Publication Data

US 2024/0408547 A1 Dec. 12, 2024

(30) Foreign Application Priority Data

Jun. 7, 2023 (KR) ........................ 10-2023-0073221
May 9, 2024 (KR) ........................ 10-2024-0060997

(51) Int. Cl.
*B01D 61/24* (2006.01)
*B01D 63/08* (2006.01)

(52) U.S. Cl.
CPC ......... *B01D 61/243* (2013.01); *B01D 63/088* (2013.01); *B01D 2313/08* (2013.01)

(58) Field of Classification Search
CPC . B01D 61/243; B01D 63/088; B01D 2313/08
See application file for complete search history.

(56) References Cited

FOREIGN PATENT DOCUMENTS

WO      WO 2014/031532      *   2/2014   ............. C40B 20/00

OTHER PUBLICATIONS

Miffy Hok Yan Cheng et al., "Induction of Bleb Structures in Lipid Nanoparticle Formulations of mRNA Leads to Improved Transfection Potency", Advanced Materials, 2023, pp. 1-11, 35, 2303370.
Nikolay Dimov et al., "Formation and purification of tailored liposomes for drug delivery using a module-based micro continuous-flow system", Scientific Reports, Sep. 21, 2017, pp. 1-13, 7:12045.

(Continued)

*Primary Examiner* — Trevor Love
(74) *Attorney, Agent, or Firm* — Sughrue Mion, PLLC

(57) ABSTRACT

Provided is a microfluidic dialysis module including an upper plate having an upper flow path through which a first fluid flows therein formed on one surface thereof, and an upper inlet through which the first fluid flows into the upper flow path and an upper outlet through which the first fluid flows out of the upper flow path; a lower plate having a lower flow path through which a second fluid flows therein, and having a plurality of lower inlets through which the second fluid flows into the lower flow path and a plurality of lower outlet through which the second fluid flows out of the lower flow path; a membrane disposed between the one surface of the upper plate and the one surface of the lower plate and formed in a porous membrane structure; and a fixing member coupling the upper plate and the lower plate.

18 Claims, 32 Drawing Sheets

(56) References Cited

OTHER PUBLICATIONS

Léna Guyon et al., "Relevant Physicochemical Methods to Functionalize, Purify, and Characterize Surface-Decorated Lipid-Based Nanocarriers", Molecular Pharmaceutics, Nov. 27, 2022, pp. A-U.

Zhiyu He et al., "Size-Controlled Lipid Nanoparticle Production Using Turbulent Mixing to Enhance Oral DNA Delivery", Acta Biomaterialia, 2018, 43 pages.

R. R. Hood et al., "Microfluidic remote loading for rapid single-step liposomal drug preparation", Lab on Chip, 2014, pp. 3359-3367, 43.

Prameen C. Kalikavunkal et al., "Tuning of salt separation efficiency by flow rate control in microfluidic dynamic dialysis", Microfluidics and Nanofluidics, 2019, 23:111, pp. 1-11.

Jing Luo et al., "Recent Progress of Microfluidic Devices for Hemodialysis", Small, 2019, pp. 1-14, 1904076.

Masatoshi Maeki et al., "Mass production system for RNA-loaded lipid nanoparticles using piling up microfluidic devices", Applied Materials Today, 2023, pp. 1-11, 13, 101754.

Jan Scrimgeour et al., "Microfluidic dialysis cell for characterization of macromolecule interactions", Soft Matter, 2011, pp. 4762-4767, 7.

Magda Skou et al., "In situ microfluidic dialysis for biological small-angle X-ray scattering", Journal of Applied Crystallography, 2014, pp. 1355-1366, 47.

Robert D. Worsham et al., "Impact of ethanol on continuous inline diafiltration of liposomal drug products", Biotechnology Journal, 2023, pp. 1-9, 18:2300194.

* cited by examiner

10

11 : 111, 113

10

13 : 131, 132, 133, 134

10

11 : 111, 113
13 : 131, 133

20

20
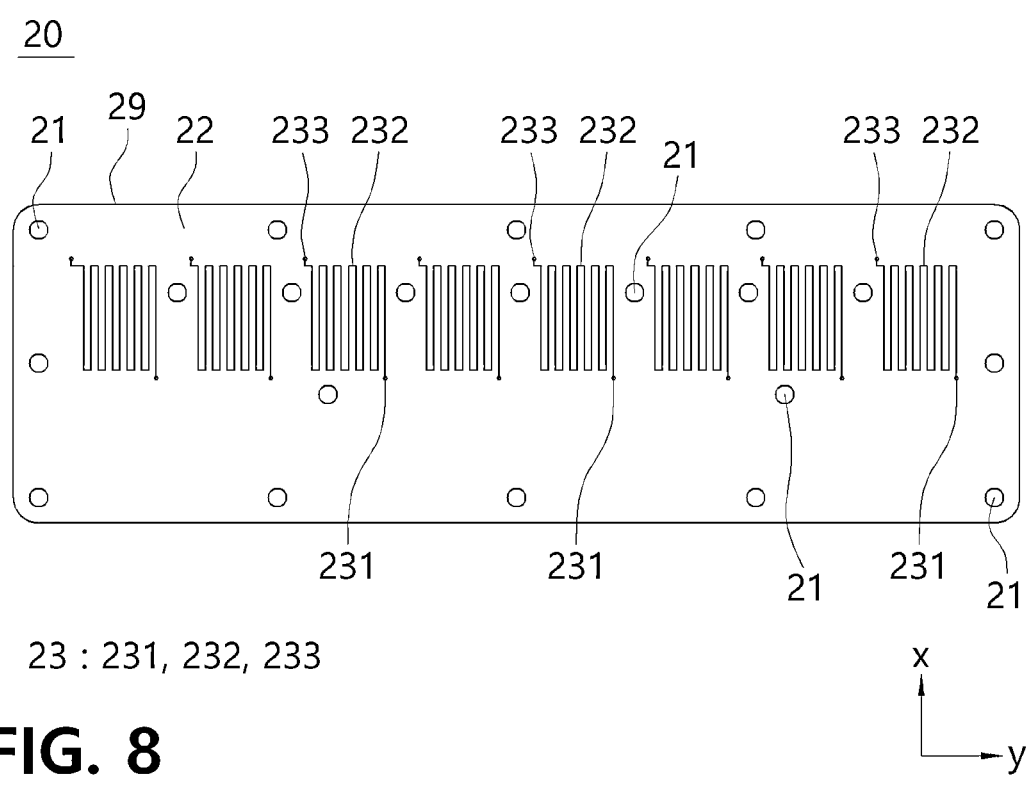
23 : 231, 232, 233
FIG. 8
FIG. 9
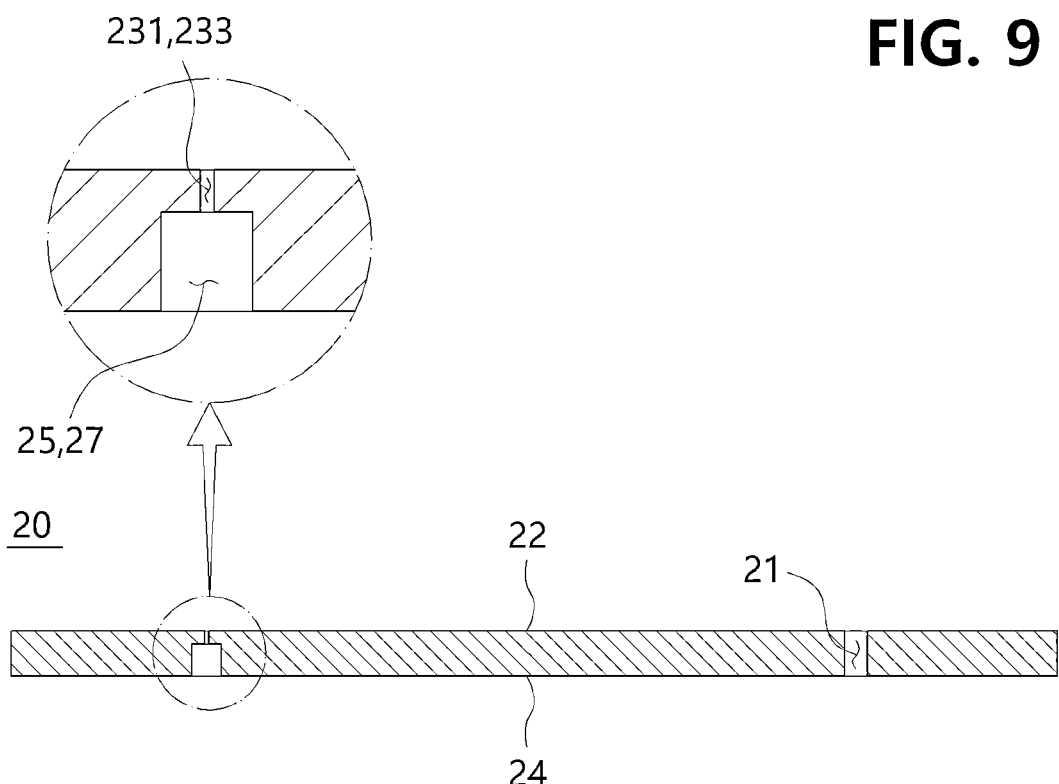

a

* Multiple buffer injection ( ⇨ ) → *dC* reproduced
* Microscale channel → *dX* decreased $$\Uparrow J = -D\frac{dC}{dx}$$

a

1

MICROFLUIDIC DIALYSIS MODULE AND CONTINUOUS PURIFICATION METHOD FOR DRUG CARRIERS OR BIOMEDICINE USING THE SAME

CROSS-REFERENCE TO RELATED APPLICATION

This application claims priority to and the benefit of Korean Patent Application No. 10-2023-0073221, filed on Jun. 7, 2023, and Korean Patent Application No. 10-2024-0060997, filed on May 9, 2024, the disclosures of which is incorporated herein by reference in its entirety.

FIELD

The present disclosure relates to a microfluidic dialysis module and continuous purification method for drug carriers or biomedicine using the same.

BACKGROUND

Recently, interest in nanoparticle-based drug delivery systems (NPDDS) has been increased due to their superior potential to improve therapeutic efficacy through improved drug stability and facilitated cell uptake. In particular, lipid-based nanoparticles (LBNPs) have received considerable attention as promising drug delivery systems due to their excellent biocompatibility and biodegradability. Among the various approaches to preparing LBNPs, microfluidic-based mixers have been developed to be used due to the ability to precisely control particle size and uniformity that directly affect therapeutic efficacy by specific biological distribution and tissue penetration.

As a result, the synthesized LBNPs require a careful purification process that replaces the acid buffer used in the synthesis step with physiological buffer (pH 7.4), and thoroughly removes unencapsulated drugs and other reagents to ensure accurate administration without side effects. In particular, alcohol-based organic solvents (e.g., ethanol) may cause instability of LBNPs, so that rapid removal is necessary. The amphiphilic ethanol molecules interfere with hydrogen bonds between lipid head groups and disrupt the arrangement of the hydrophobic tail regions. As a result, destabilization of LBNPs leads to leakage of encapsulated drugs, as well as a collective fusion, increasing the size and distribution of LBNP, which causes low uptake into target cells and accumulation in unwanted organs and cells, resulting in a rapid decrease in therapeutic efficacy due to cytotoxicity. For this reason, careful and highly reproducible purification processes of synthesized LBNPs are important to maintain initial uniformity of size and encapsulation efficiency for in vivo administration. In addition, there is a growing interest in the effect of the purification step on the quality control of LBNPs, considering it as an important variable in the experimental design of the manufacturing process rather than the discontinuous separation process.

Among the various purification methods, diafiltration and dialysis are generally used to adjust the pH and remove impurities of LBNPs sample. However, in the case of centrifugal diafiltration, as the sample diluted with the exchange buffer is concentrated, nanoparticles tend to aggregate and adhere to the surface of the membrane. This phenomenon ultimately requires additional steps to reduce penetration flow and redisperse nanoparticles. In order to overcome this problem and enable continuous (or semicontinuous) purification of LBNPs, Non-Patent Documents 1 to 3 have selected to utilize tangential flow filtration (TFF) methods in a diafiltration mode instead of dead-end filtration methods such as centrifugation or pressure-based methods. However, this method also changes initial characteristics by continuously applying stress to LBNPs. Moreover, due to the elasticity of LBNPs, certain particles may penetrate the membrane, lowering the particle recovery rate and causing membrane fouling problems, which in turn make it difficult to maintain long-term operation.

In contrast, according to Non-Patent Document 4, conventional dialysis provides a notable advantage of minimizing LBNP loss and aggregation by relying on molecular diffusion, since conventional dialysis is a milder purification method compared to other dialysis methods and thus reduces stress on LBNP. However, this process requires a considerable amount of time (8 to 16 hours) and a large amount of buffer (1000 times the volume of the sample). In addition, when LBNPs are exposed to alcohol solvents for a long period of time, it has a negative effect on stability as mentioned above. Therefore, it is essential to develop a dialysis-based purification module that may rapidly remove alcohol impurities while maintaining the properties of LBNPs. According to Non-Patent Documents 5 to 9, there have been several attempts to use a microfluidic process for dialysis application such as salt separation, hemodialysis, and drug-activated loading. However, although the efficiency was relatively improved compared to the conventional batch dialysis, the purification performance according to specific selectivity was not satisfactory due to the limited diffusion phenomenon between the sample and buffer in the microchannel. Therefore, there is a need to develop a new purification method that maximizes the mass transfer rate and selectivity and increases the diffusion rate in a rapid and low flow pressure manner without nanoparticle fusion and leakage of the encapsulated drug.

Therefore, the present inventors developed a microfluidic-multiple buffer injector (MBI) that enables an ultrafast flow-mediated purification process under accelerated molecular diffusion between double channels partitioned by an intermediate membrane layer to preserve the initial synthesis characteristics of LBNP. The principle is to continuously inject a new buffer into several segments of the dialysis region in the lower channel to continuously reproduce the concentration gradient (FIG. 10A). In addition, it is well established that the microfluidic system controls the residence time to improve the mass transfer at the precisely new interface. In the present disclosure, a mixture of liposome samples loaded with dual-drug of doxorubicin (DOX) and curcumin (CCM) prepared by a self-use micromixer was selected, and complete ethanol removal performed by real-time monitoring through an online GC, initial encapsulation efficiency of two drugs with a rapid change in pH to neutral in just 15 minutes and little leakage during rapid dialysis, and maintenance of the size of the liposome and the polydispersity index (PDI) value after 16 hours of aging was successfully demonstrated. In particular, liposomes purified through MBI exhibited superior cell uptake efficacy compared to samples purified through batch dialysis, diafiltration, and microfluidic single buffer injectors, resulting in improved antitumor effects. In addition, the applicability of the newly developed method was demonstrated by purifying various samples of cationic liposomes, high concentration lipid nanoparticles (LNP), and laccase enzymes.

(Non-Patent Document 1) Worsham, R. D., Thomas, V. & Farid, S. S. Impact of ethanol on continuous inline diafiltration of liposomal drug products. Biotechnol. J. 18 2300194 (2023).

(Non-Patent Document 2) He, Z. et al. Size-controlled lipid nanoparticle production using turbulent mixing to enhance oral DNA delivery. Acta Biomater. 81, 195-207 (2018).

(Non-Patent Document 3) Dimov, N., Kastner, E., Hussain, M., Perrie, Y. & Szita, N. Formation and purification of tailored liposomes for drug delivery using a module-based micro continuous-flow system. Sci. Rep. 7, 12045 (2017).

(Non-Patent Document 4) Guyon, L., Groo, A.-C. & Malzert-Freon, A. Relevant Physicochemical Methods to Functionalize, Purify, and Characterize Surface-Decorated Lipid-Based Nanocarriers. Mol. Pharmaceutics 18, 44-64 (2020).

(Non-Patent Document 5) Kalikavunkal, P. C., Green, N. G. & De Planque, M. R. Tuning of salt separation efficiency by flow rate control in microfluidic dynamic dialysis. Microfluid. Nanofluidics 23, 111 (2019).

(Non-Patent Document 6) Luo, J., Fan, J. B. & Wang, S. Recent progress of microfluidic devices for hemodialysis. Small 16, 1904076 (2020).

(Non-Patent Document 7) Hood, R., Vreeland, W. & DeVoe, D. L. Microfluidic remote loading for rapid single-step liposomal drug preparation. Lab Chip 14, 3359-3367 (2014).

(Non-Patent Document 8) Scrimgeour, J., Cho, J. K., Breedveld, V. & Curtis, J. Microfluidic dialysis cell for characterization of macromolecule interactions. Soft Matter 7, 4762-4767 (2011)

(Non-Patent Document 9) Skou, M., Skou, S., Jensen, T. G., Vestergaard, B. & Gillilan, R. E. In situ microfluidic dialysis for biological small-angle X-ray scattering. J. Appl. Crystallogr. 47, 1355-1366 (2014).

SUMMARY

Technical Problem

Therefore, it is an object of the present disclosure to provide a microfluidic dialysis module including a microfluidic-multiple buffer injector.

It is also an object of the present disclosure to provide a method for purifying a drug delivery system or a biopharmaceutical using the microfluidic dialysis module.

Technical Solution

In order to solve the above-mentioned problems, the present disclosure provides a microfluidic dialysis module capable of mass exchange between a first fluid and a second fluid, the microfluidic dialysis module, including: an upper plate having an upper flow path through which the first fluid flows therein, an upper inlet through which the first fluid flows into the upper flow path and an upper outlet through which the first fluid flows out of the upper flow path; a lower plate having a lower flow path through which the second fluid flows therein, and a plurality of lower inlets through which the second fluid flows into the lower flow path and a lower outlet through which the second fluid flows out of the lower flow path; a membrane disposed between the upper plate and the lower plate and formed in a porous membrane structure; and a fixing member coupling the upper plate and the lower plate, wherein a direction in which the first fluid flows in the upper flow path and a direction in which the second fluid flows in the lower flow path are opposite to each other.

In the present disclosure, the upper inlet may be located at one end of the upper flow path and the upper outlet may be located at the other end of the upper flow path.

In the present disclosure, the upper flow path may include an upper diffusion flow path extending while switching directions at least twice, and the lower flow path may include a lower diffusion flow path extending while switching directions at least twice.

In the present disclosure, the upper flow path may include a plurality of upper diffusion flow paths and one or more upper connection flow paths respectively disposed between the plurality of upper diffusion flow paths to fluidly connect two adjacent upper diffusion flow paths.

In the present disclosure, the lower flow path may include a plurality of lower diffusion flow paths, and the plurality of lower diffusion flow paths are formed to be fluidly separated from each other.

In the present disclosure, the lower inlet and the lower outlet may be formed in the same number as the number of lower diffusion flow paths, and the lower outlet may be fluidly connected to one end of each of the lower diffusion flow paths, and the lower inlet may be fluidly connected to the other end of each of the lower diffusion flow paths.

In the present disclosure, the positions of the upper plate in which each of the upper diffusion flow paths are disposed correspond to the positions of the lower plate in which each of the lower diffusion flow paths are disposed, and each lower diffusion flow path may be located below each the upper diffusion flow path when the upper plate and the lower plate are coupled by the fixing member with the membrane interposed therebetween.

In the present disclosure, the upper flow path is formed such that bottom surface thereof is exposed on the bottom surface of the upper plate, and the lower flow path may be formed such that top surface thereof is exposed on the one surface of the lower plate.

In the present disclosure, the width of the upper inlet and the width of the upper outlet may be formed to be wider than the width of the upper flow path, respectively, and the width of the lower inlet and the width of the lower outlet may be formed to be wider than the width of the lower flow path, respectively.

In the present disclosure, the upper inlet and the upper outlet may be formed to penetrate the upper plate in a vertical direction, upper ends of the upper inlet and the upper outlet may be located on the top surface of the upper plate, and lower ends may be located in the upper flow path, the lower inlet and the lower outlet may be formed to penetrate the lower plate in a vertical direction, lower ends of the lower inlet and lower outlet may be located on the bottom surface of the lower plate, and upper ends may be located in the lower flow path.

In the present disclosure, the upper plate may include one or more upper fastening hole formed by passing through the upper plate in a vertical direction, and the lower plate may include one or more lower fastening hole formed by passing through the lower plate in the vertical direction, wherein the positions where the upper fastening hole is formed in the upper plate and the positions where the lower fastening hole is formed in the lower plate correspond to each other, so that the upper fastening hole and the lower fastening hole, which are located at the positions corresponding to each other, may be penetrated and fastened together by the fixing member.

In the present disclosure, the upper fastening hole may be formed by a plurality of holes spaced apart from each other along edges of the top surface and the bottom surface of the upper plate, and the lower fastening hole may be formed by a plurality of holes spaced apart from each other along edges of the top surface and the bottom surface of the lower plate to correspond to positions where the upper fastening holes are formed.

In the present disclosure, the upper fastening holes may be formed between the plurality of upper diffusion flow paths, respectively, and the lower fastening holes may be formed between the plurality of lower diffusion flow paths, respectively.

In the present disclosure, the upper fastening holes and the lower fastening holes may be formed in a central part of the upper plate and the lower plate, respectively.

Additionally, the present disclosure provides a method for purifying a drug delivery system or a biopharmaceutical using the above-described microfluidic dialysis module.

In the present disclosure, a solvent comprising the drug delivery system or biopharmaceutical may be injected into the upper flow path, and a buffer solution for dialysis may be injected into the lower flow path.

In the present disclosure, the drug delivery system may include a liposome, a lipid-based nanoparticle, a polymer-based nanoparticle, an inorganic-based nanoparticle or a protein nanoparticle, and the biopharmaceutical may include an enzyme.

In the present disclosure, one or more impurities selected from the group consisting of alcohol solvents, nucleic acids, peptides, and unencapsulated drugs may be removed from the drug delivery system or biopharmaceutical.

In the present disclosure, the solvent comprising the drug delivery system or biopharmaceutical injected into the upper flow path may be replaced with the buffer solution injected into the lower flow path through salt exchange between the flow of the solvent comprising the drug delivery system or biopharmaceutical injected into the upper flow path and the flow of the buffer solution injected into the lower flow path.

In the present disclosure, a flow rate ratio (FRR) of the solvent comprising the drug delivery system or biopharmaceutical injected into the upper flow path and the buffer solution injected into the lower flow path may be 1 to 32.

In the present disclosure, the method for purifying the drug delivery system or biopharmaceutical using the microfluidic dialysis module may represent a recovery rate of the drug delivery system or biopharmaceutical of 95% or more.

In the present disclosure, a pH of the solvent comprising the drug delivery system and biopharmaceutical purified by the method of purifying the drug delivery system or biopharmaceutical using the microfluidic dialysis module may be 7.2 to 7.4.

In the present disclosure, when the drug delivery system is a liposome or lipid-based nanoparticle, the drug delivery system purified by the method of purifying the drug delivery system using the microfluidic dialysis module may maintain an initial encapsulation efficiency, initial particle size, and initial polydispersity index of the drug.

In the present disclosure, the method for purifying the drug delivery system or biopharmaceutical using the microfluidic dialysis module may reduce the use amount and purification time of a buffer solution for dialysis compared to a method for purifying the drug delivery system or biopharmaceutical using a batch dialysis or diafiltration.

In the present disclosure, the method for purifying the drug delivery system using the microfluidic dialysis module may exhibit at least one of the following properties a) to e) compared to a method for purifying the drug delivery system using a batch dialysis or diafiltration: a) increase a production performance index defined by the product of a reciprocal of diameter of the drug delivery system particle and a polydispersity index value of the drug delivery system, b) decrease buffer solution usage, c) increase drug preservation capability, d) decrease purification time, and e) increase recovery rate of drug delivery system.

In addition, the present disclosure provides a drug delivery system purified by the method for purifying the drug delivery system or biopharmaceutical using the above-described microfluidic dialysis module.

In the present disclosure, the drug delivery system may be a dual-drug loaded liposome, a cationic liposome, a high concentration lipid nanoparticle, a polymer-based nanoparticle, an inorganic-based nanoparticle, or a protein-based nanoparticle.

In the present disclosure, the drug delivery system may have a higher cell uptake rate compared to the drug delivery system purified by batch dialysis or diafiltration and maintain an initial encapsulation efficiency, initial particle size, and initial polydispersity index of the drug even after an aging period.

Advantageous Effects

The method for purifying a drug delivery system or biopharmaceutical using the microfluidic dialysis module according to the present disclosure may purify the drug delivery system or biopharmaceutical at a high concentration in a much shorter time compared to conventional batch dialysis and diafiltration, and have excellent purification efficiency.

In addition, when the drug delivery system to be purified are liposomes or lipid-based nanoparticles, it is advantageous for administration in the body by maintaining initial encapsulation efficiency, particle size, and polydispersity index.

BRIEF DESCRIPTION OF THE DRAWINGS

FIG. 8 is a top view illustrating a top surface of a lower plate of a microfluidic dialysis module according to an embodiment of the present disclosure.

FIG. 9 is a cross-sectional view illustrating a cross-section of a lower plate of a microfluidic dialysis module according to an embodiment of the present disclosure.

FIG. 10A is a schematic diagram of a microfluidic multiple buffer injector (MBI) for ultrafast flow dialysis of a mixture of liposomes, lipid nanoparticles, and enzymes, FIG. 10B is a simulation result comparing remaining ethanol mol % at each point of MBI-N(N=1, 2, 4, 8, and 16) at 15 minutes of counter-flow and residence time. FIG. 10C illustrates an optical image of an MBI-N manufactured and assembled module through a clamping method. FIG. 10D compares ethanol removal performance and pH adjustment after applying batch dialysis, MBI-1, and MBI-8 at a dialysis time of 15 minutes.

FIG. 11A illustrates a schematic diagram of an MBI-N design for CFD simulation. Eight points (P1~P8) were set within the sample channel, and the remaining ethanol percentage at each point was calculated. FIG. 11B illustrates the ethanol percentage remaining at eight points depending on residence time, buffer flow direction, and N value. FIG. 11C is a simulation image depicting the behavior of ethanol at a residence time of 15 minutes under the buffer flow direction as countercurrent.

FIG. 12A is an optical image of micro channel patterned (height of 100 and 300 μm) upper and lower plates. The below images are magnified views of each channel (dashed boxes). FIG. 12B illustrates experimental setup of MBI-16. For sample injection, a syringe pump (Pump 1) was used, and for the injection of PBS into 16 separate inlets, four syringe pumps (Pump 2, 3, 4, and 5) and one peristaltic pump with eight lines were utilized. The sample outlet was directly connected to an on-line GC for real time measuring the remaining ethanol percentage. FIG. 12C illustrates a brief schematic diagram of MBI-N operating system and on-line GC system.

FIG. 13A illustrates trends related to residence time and FRR value for MBI-1 with a channel height of 300 μm. FIG. 13B illustrates trends according to N and FRR values under conditions of 15 minutes residence time and 300 μm channel height. FIG. 13C illustrates trends related to residence time and N value under conditions of an FRR value of 8 and 100 μm channel height.

FIG. 14A illustrates remaining ethanol percentage and pH of the sample during the batch dialysis. FIG. 14B illustrates remaining ethanol percentage and pH of the sample after each cycle of diafiltration process. FIG. 14C illustrates liposome recovery rate after purification using four different methods. FIG. 14D illustrates required volume of PBS for purifying 3 mL liposome sample.

FIG. 15A illustrates the time required for the complete purification process, FIG. 15B illustrates the size and PDI value of the purified liposome sample, and FIG. 15C illustrates a size distribution graph of the purified liposome sample. FIG. 15D illustrates TEM images before (1) and after (2) storing the sample purified with MBI-8 at 4° C. for 7 days (scale bar=50 nm), and FIG. 15E illustrates the size distribution graph before and after storing the sample purified with MBI-8 at 4° C. for 7 days. FIG. 15F illustrates DOX and CCM encapsulation efficiency of the purified liposome sample. FIG. 15G illustrates a radar graph plotted as normalized factors: production performance index (Q=size$^{-1}$ PDI$^{-1}$), buffer saving (BS), drug preservation capability (DPC, DOX and CCM % conserved in liposomes after purification), time saving (TS), and liposome recovery (R). The purification efficiency was calculated based on the area of the graph, and the efficiency was indicated under each radar graph.

FIG. 19A illustrates a fluorescent image for cell absorption and a merged image with a bright field image captured by CLSM (scale bar=50 μm). FIG. 19B illustrates flow cytometry data, and FIG. 19C illustrates relative cell uptake quantified after dual-drug loaded liposome treatment for 4 hours. FIG. 19D illustrates relative cell viability, and illustrates cytotoxicity observed in HeLa cells after 24 hours of treatment with dual-drug loaded liposomes. The p values of FIGS. 19C and 19D were calculated using a t-test (*p<0.001, p<0.01, *p<0.05), and in the case where the comparison target is not designated in FIG. 19D, the p-values between the control group and the series are shown.

FIG. 21A illustrates size and PDI of cationic liposome, and FIG. 21B illustrates size distribution peak of cationic liposome. FIG. 21C illustrates size and PDI of high concentration empty lipid nanoparticles (LNPs), and FIG. 21D illustrates size distribution peak of high concentration empty LNPs.

FIG. 22B illustrates a protein concentration and a pH value of laccase samples according to dialysis conditions.

FIG. 23A illustrates a concise schematic illustration of laccase purification using MBI-N, and FIG. 23B illustrates enzyme activity according to dialysis conditions.

FIG. 24A illustrates an experimental schematic diagram. After injecting dual-drug loaded liposomes into MBI-8, the drug in which the refined sample is mixed with methanol and which is encapsulated is exposed to the outside. Thereafter, injecting into real-time UV-Vis. FIG. 24B illustrates a result of measuring absorbance with respect to 420 nm and 485 nm at intervals of 2 minutes. FIG. 24C is a result showing an increased absorbance due to a membrane fouling phenomenon. FIG. 24D is a conversion of absorbance at 420 nm and 485 nm to drug concentration, showing the percentage (%) of unencapsulated drugs that have not been removed. FIG. 24E illustrates the size and uniformity of the particles measured at 10 minute intervals.

DETAILED DESCRIPTION

Figure 1:
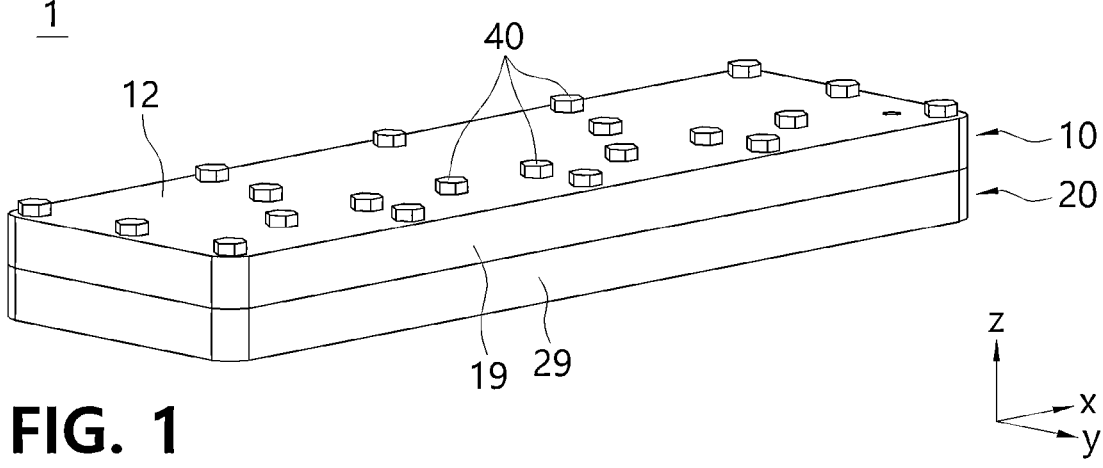
FIG. 1 is a perspective view illustrating a microfluidic dialysis module according to an embodiment of the present disclosure.

Hereinafter, embodiments of the present disclosure will be described in detail with reference to the accompanying drawings so that those skilled in the art can easily implement them. The present disclosure may be implemented in various different forms and is not limited to the embodiments described herein. In the drawings, in order to clearly explain the present disclosure, parts irrelevant to the description were omitted, and the same or similar components were designated by the same reference numerals throughout the entire specification.

The words and terms used in this specification and the claims are not interpreted as limited to ordinary or dictionary meanings, but should be interpreted as meanings and concepts consistent with the technical idea of the present disclosure according to the principle in which the inventor can define the terms and concepts in order to best explain their invention.

In this specification, the terms "include" or "have" and the like are intended to describe the presence of features, numbers, steps, operations, components, parts or combinations thereof described in the specification, and should not be construed as excluding the presence or addition of one or more other features, numbers, steps, operations, components, parts or combinations thereof.

In the drawings, the thickness or size is exaggerated to clearly express the characteristics of the structure, and the thickness or size of the structure shown in the drawings is not necessarily the same as that of the actual structure.

Hereinafter, in describing the drawings, each direction will be described with reference to the coordinate axis shown in FIG. 1. More specifically, the positive direction of the z-axis is defined as an upper side and the negative direction of the z-axis is defined as a lower side. The positive direction of the y-axis is defined as front side and the negative direction of the y-axis is defined as rear side. The positive direction of the x-axis is defined as the right side and the negative direction of the x-axis is defined as the left side.

The microfluidic dialysis module according to an embodiment of the present disclosure is a microfluidic dialysis module that can effectively remove impurities such as organic solvents capable of causing instability of drug delivery systems such as lipid-based nanoparticles to exhibit high purification efficiency, and that a solution containing a drug (carrier) is exchanged into a buffer capable of being injected into the human body through salt exchange to allow the drug to be rapidly injected into the human body after purification.

More specifically, the microfluidic dialysis module according to an embodiment of the present disclosure is a microfluidic dialysis module capable of effectively removing impurities in a first fluid by increasing mass exchange efficiency between a first fluid from which impurities are removed and a second fluid for removing impurities contained in the first fluid through mass exchange with the first fluid.

Figure 2:
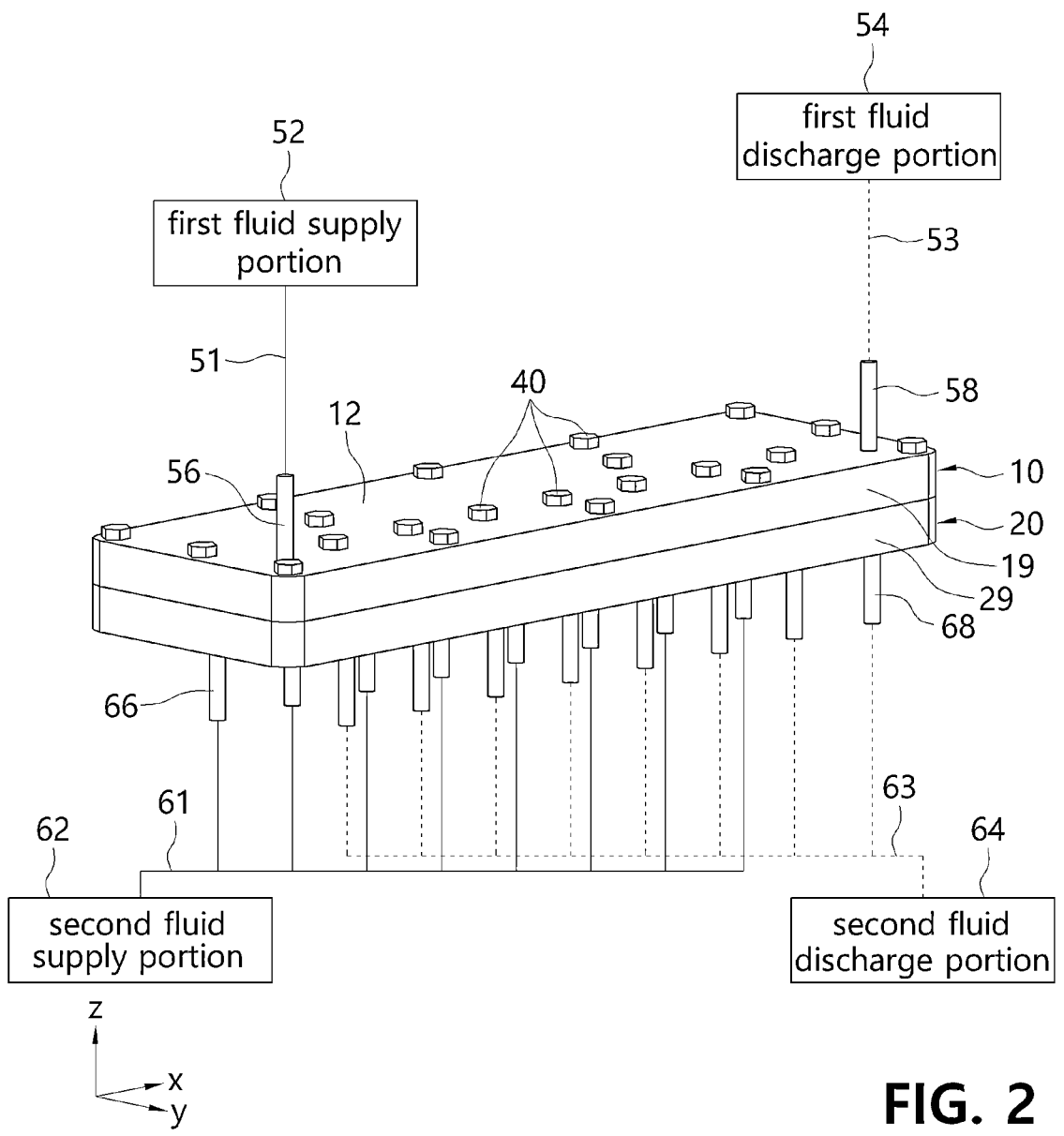
FIG. 2 is a perspective view illustrating a configuration in which a fluid supply portion and a fluid discharge portion are coupled to the microfluidic dialysis module according to an embodiment of the present disclosure.
Figure 3:
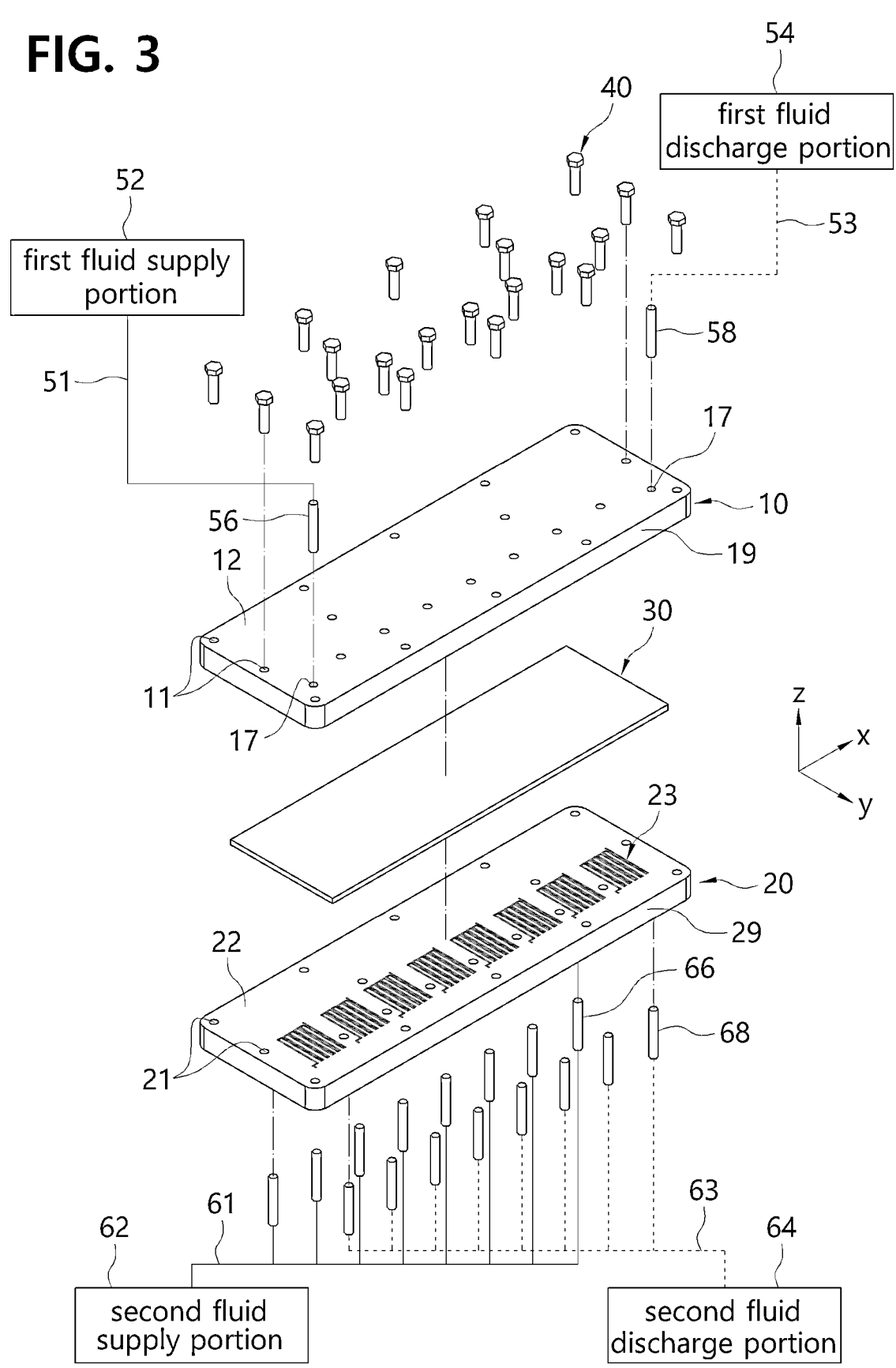
FIG. 3 is an exploded perspective view of FIG. 2.
Figure 4:
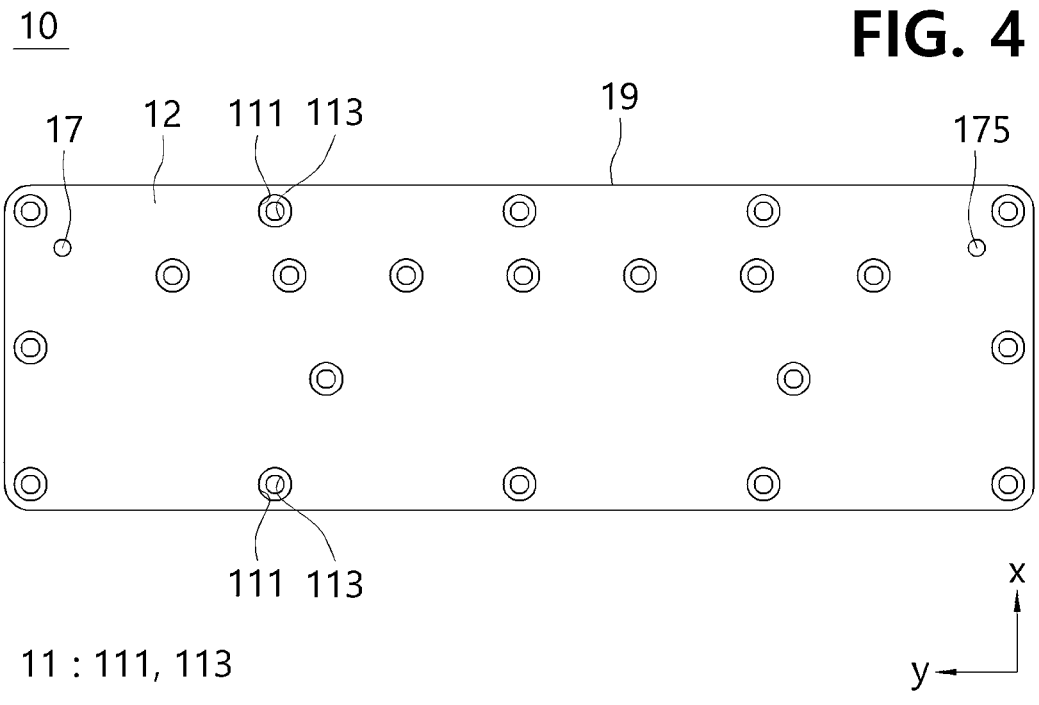
FIG. 4 is a top view of an upper plate of the microfluidic dialysis module according to an embodiment of the present disclosure.
Figure 5:
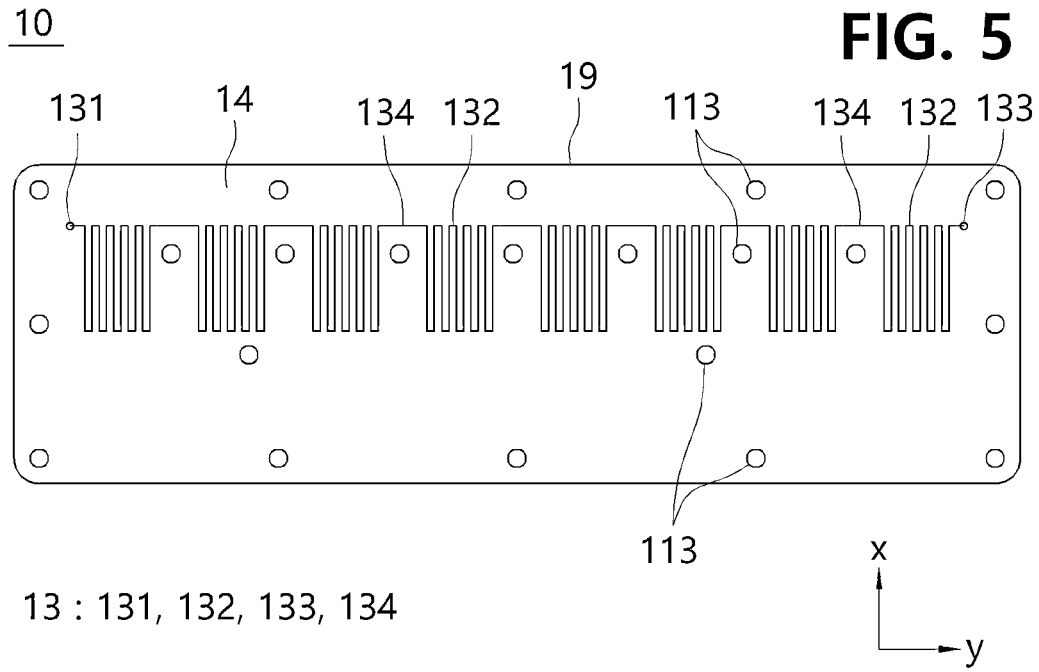
FIG. 5 is a bottom view of an upper plate of the microfluidic dialysis module according to an embodiment of the present disclosure.

FIG. 1 is a perspective view illustrating a microfluidic dialysis module according to an embodiment of the present disclosure. FIG. 2 is a perspective view illustrating a configuration in which a fluid supply portion and a fluid discharge portion are coupled to the microfluidic dialysis module according to an embodiment of the present disclosure. FIG. 3 is an exploded perspective view of FIG. 2. FIG. 4 is a top view of an upper plate of the microfluidic dialysis module according to an embodiment of the present disclosure. FIG. 5 is a bottom view of an upper plate of the microfluidic dialysis module according to an embodiment of the present disclosure.

Referring to FIGS. 1 to 5, the microfluidic dialysis module 1 according to an embodiment of the present disclosure may include an upper plate 10 having an upper flow path 13 through which a first fluid flows inside, a lower plate 20 having a lower flow path 23 through which a second fluid flows inside, and a membrane 30 disposed between the upper plate 10 and the lower plate 20 and formed in a porous membrane structure.

The upper plate 10 and the lower plate 20 of the microfluidic dialysis module 1 according to an embodiment of the present disclosure may be formed in the form of a plate having top surfaces 12 and 22 and bottom surfaces 14 and 24.

In this case, the upper plate 10 and the lower plate 20 may be formed in a rectangular parallelepiped shape having predetermined side surfaces 19 and 29, but are not limited thereto.

The upper plate 10 may be disposed such that the bottom surface 14 is in contact with the membrane 30, and the upper flow path 13 may be formed on the bottom surface 14 of the upper plate 10 so that mass exchange between the first fluid and the second fluid may be smoothly performed in relation to the lower plate 20.

More specifically, the upper flow path 13 may be formed as a hole or groove structure formed in a shape of a predetermined depth on the bottom surface 14 of the upper plate 10 toward the top surface 12 of the upper plate 10.

However, it is not necessarily limited thereto, and the upper flow path 13 is not limited to being formed in a protruding form on the bottom surface 14 of the upper plate 10.

The upper flow path 13 may be formed so that one surface is exposed on the bottom surface 14 of the upper plate 10 for smooth mass exchange.

For example, the upper flow path 13 may be formed such that the bottom surface thereof is exposed on the bottom surface 14 of the upper plate 10, as shown in FIG. 5.

Accordingly, the bottom surface of the upper flow path 13 may be in direct contact with the membrane 30, and the first fluid flowing in the upper flow path 13 may interact with the second fluid through the bottom surface of the upper flow path 13 via the membrane 30.

In addition, the upper flow path 13 may extend by switching directions at least twice within the upper plate 10 to increase the contact area compared to the length of the upper plate 10.

Referring to FIG. 5, the upper flow path 13 may include an upper diffusion flow path 132 formed by switching directions at least twice, and an upper connection flow path 134 connecting two or more upper diffusion flow paths 132.

At this time, the upper diffusion flow path 132 may be formed in a serpentine structure that moves to the right and reciprocates in the vertical direction, as shown in the drawing.

This is to ensure that the upper diffusion flow path 132 has a longer length than the area of the bottom surface 14 of the upper plate 10, and does not necessarily have to be formed as a flow path with the same path as shown in FIG. 5.

For example, in addition to the structure shown in FIG. 5, the upper diffusion flow path 132 may be formed in a serpentine structure moving downward or upward and reciprocating in the left and right directions, and may be formed in a structure including a plurality of curves.

Such upper diffusion flow path 132 may be formed in plural.

Referring to FIG. 5, the microfluidic dialysis module 1 according to an embodiment of the present disclosure may include eight upper diffusion flow paths 132, but is not limited thereto.

For example, the microfluidic dialysis module 1 according to another embodiment of the present disclosure may be formed to include four upper diffusion flow paths 132 or sixteen upper diffusion flow paths 132.

The plurality of upper diffusion flow paths 132 may be connected by the upper connection flow paths 134.

Referring to FIG. 5, the upper connection flow path 134 according to an embodiment of the present disclosure may be disposed between two adjacent upper diffusion flow paths 132 to fluidly connect the two adjacent upper diffusion flow paths 132.

However, the present disclosure is not limited thereto, and the upper connection flow path 134 may be formed to fluidly connect the three or more upper diffusion flow paths 132, and the upper connection flow path 134 may be disposed at other locations rather than between the adjacent upper diffusion flow paths 132.

According to this structure, the upper flow path 13 according to an embodiment of the present disclosure may be formed so that the entire upper flow path 13 is fluidly connected as shown in FIG. 5, as the plurality of upper diffusion flow paths 132 are connected by the upper connection flow path 134.

In this case, an upper flow path inlet 131 may be located at one end of the upper flow path 13, and an upper flow path outlet 133 may be located at the other end of the upper flow path 13.

Accordingly, the first fluid introduced into the upper flow path inlet 131 may flow out to the upper flow path outlet 133 through the plurality of upper diffusion flow paths 132 and the upper connection flow path 134 in the upper flow path 13, thereby forming a flow of the first fluid.

In the microfluidic dialysis module 1 according to an embodiment of the present disclosure, the upper flow path inlet 131 may be disposed in the negative direction of the x-axis, that is, on the left side, relative to the upper flow path outlet 133.

Therefore, in the microfluidic dialysis module 1 according to an embodiment of the present disclosure, the flow of the first fluid is generally in a direction from left to right.

Referring to FIGS. 1 to 4, an upper inlet 15 for introducing the first fluid into the upper flow path 13 and an upper outlet 17 for discharging the first fluid from the upper flow path 13 may be formed on the top surface of the upper plate 10.

The upper inlet 15 may be formed above the upper flow path inlet 131, and the upper outlet 17 may be formed above the upper flow path outlet 133.

Referring to FIGS. 2 and 3, a first fluid supply pipe 56 fluidly connected to a first fluid supply portion 52 through a first fluid supply flow path 51 may be connected to the upper inlet 15.

Accordingly, the first fluid is introduced into the upper inlet 15 from the first fluid supply pipe 56, and the first fluid introduced into the upper inlet 15 may be introduced into the upper flow path 13 through the upper flow path inlet 131 via the upper inlet 15.

Likewise, referring to FIGS. 2 and 3, a first fluid discharge pipe 58 fluidly connected to a first fluid discharge portion 54 through a first fluid discharge flow path 53 may be connected to the upper outlet 17.

Therefore, the first fluid flowing in the upper flow path 13 may be discharged to the first fluid discharge pipe 58 through the upper outlet 17 via the upper flow path outlet 133, and the first fluid discharged to the first fluid discharge pipe 58 may be moved to the first fluid discharge portion 54 via the first fluid discharge flow path 53.

Figure 6:
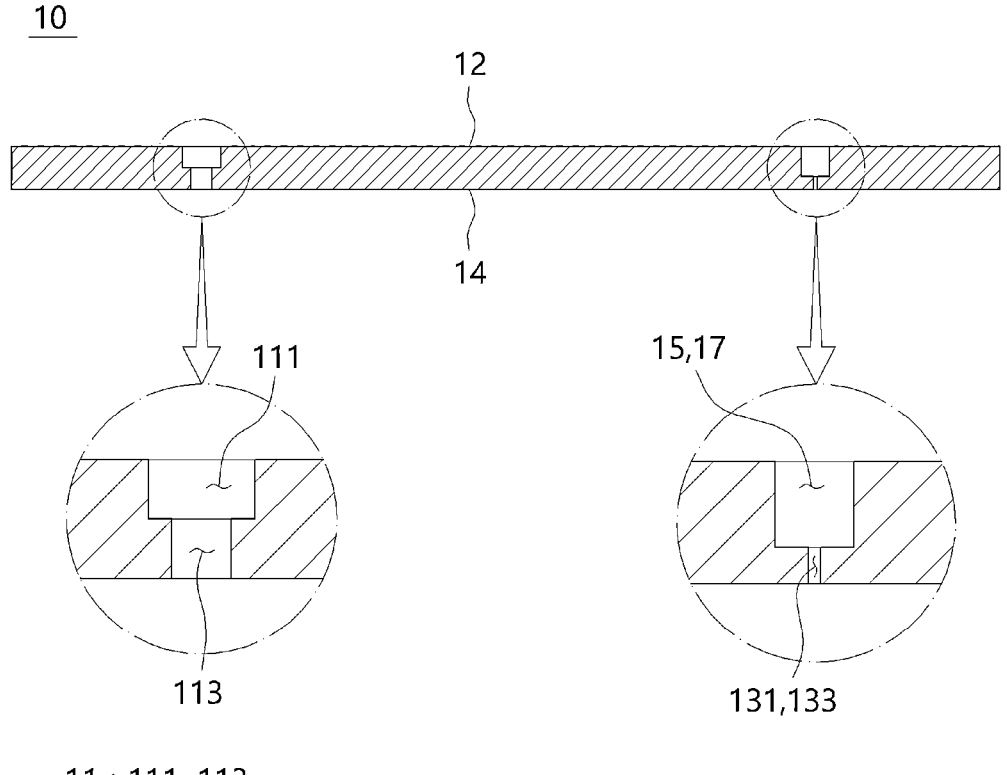
FIG. 6 is a cross-sectional view illustrating a cross-section of an upper plate of the microfluidic dialysis module according to an embodiment of the present disclosure.

FIG. 6 is a cross-sectional view illustrating a cross-section of an upper plate of the microfluidic dialysis module according to an embodiment of the present disclosure.

Referring to FIG. 6, the upper inlet 15 and the upper outlet 17 may be formed to extend by a predetermined depth from the top surface 12 toward the surface 14 of the upper plate 10, and the upper flow path inlet 131 and the upper flow path outlet 133 may be formed to extend by a predetermined depth from the surface 14 toward the surface 12 of the upper plate 10.

As described above, since the upper inlet 15 and the upper outlet 17 may be positioned above the upper flow path inlet 131 and the upper flow path outlet 133, so that the height direction ends of the upper inlet 15 and the upper outlet 17 may be formed to communicate with the height direction ends of the upper flow path inlet 131 and the upper flow path outlet 133.

Accordingly, the upper plate 10 may be penetrated in the vertical direction by the upper inlet 15 and the upper flow path inlet 131, and may be penetrated in the vertical direction by the upper outlet 17 and the upper flow path outlet 133.

In this case, the widths of the upper inlet 15 and the upper outlet 17 may be formed to be wider than the widths of the upper flow path inlet 131 and the upper flow path outlet 133.

In the microfluidic dialysis module 1 according to an embodiment of the present disclosure, the upper flow path 13 has the upper flow path inlet 131 and the upper flow path outlet 133 at one end and the other end, respectively, and the upper inlet 15 and although the upper outlet 17 has been described as being disposed vertically above the upper flow path inlet 131 and vertically above the upper flow path outlet 133, respectively, but are not necessarily limited thereto.

For example, the upper flow path 13 may not separately include the upper flow path inlet 131 and the upper flow path outlet 133 at one end and the other end, and the upper inlet 15 and the upper outlet 17 may be formed to be connected to different points of the upper flow path 13, respectively, rather than one end and the other end of the upper flow path 13.

Meanwhile, the microfluidic dialysis module 1 according to an embodiment of the present disclosure may further include one or more fixing members 40 that penetrate the upper plate 10 and the lower plate 20 together to couple the upper plate 10 and the lower plate 20 with the membrane 30 therebetween.

At this time, in order for one or more fixing members 40 to be coupled, a plurality of fastening holes 11 penetrating the upper plate 10 in the vertical direction may be formed in the upper plate 10.

Referring to FIGS. 2 to 3, the fixing member 40 may include a screw head having a larger cross-sectional area than an insertion portion in which a screw thread is formed.

Accordingly, the upper plate 10 may be formed with a fastening hole 11 composed of a head coupling portion 111 and a through portion 113 to which the screw head of the fixing member 40 may be coupled so that the fixing member 40 may be stably coupled.

Since the fixing member 40 of the microfluidic dialysis module 1 according to an embodiment of the present disclosure penetrates the upper plate 10 and the lower plate 20 from the upper side to the lower side and may couple the upper plate 10 and the lower plate 20, the head coupling portion 111 among the respective components of the fastening hole 11 may be provided only on the top surface 12 of the upper plate 10, and the through portion 113 may be provided only on the bottom surface of the upper plate 10.

The shape of the fastening hole 11 is exemplary, and when the fixing member 40 passes through the upper plate 10 and the lower plate 20 from the lower side toward the upper side, the shape of the fastening hole 11 may be formed differently.

In addition, in an embodiment of the present disclosure, the fixing member 40 has a screw shape, but the fixing member 40 is not limited to the screw shape because it is sufficient to isolate the space between the upper plate 10 and the lower plate 20 from the outside by coupling the upper plate 10 and the lower plate 20.

Figure 7:
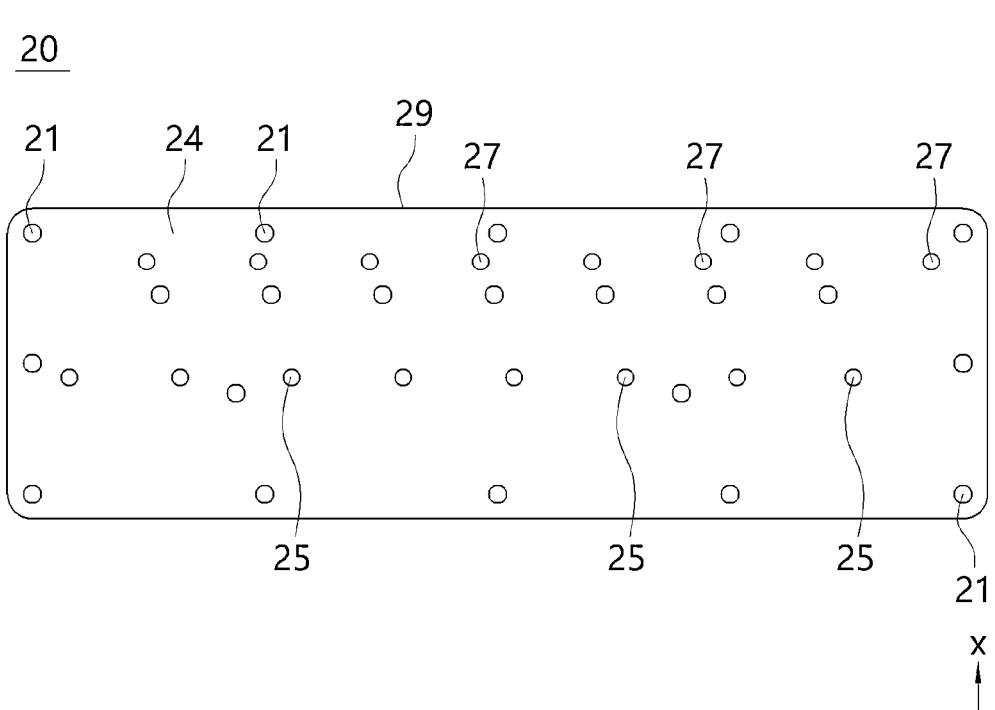
FIG. 7 is a bottom view illustrating a bottom surface of a lower plate of the microfluidic dialysis module according to an embodiment of the present disclosure.

FIG. 7 is a bottom view illustrating a bottom surface of a lower plate of the microfluidic dialysis module according to an embodiment of the present disclosure. FIG. 8 is a top view illustrating a top surface of a lower plate of a microfluidic dialysis module according to an embodiment of the present disclosure. FIG. 9 is a cross-sectional view illustrating a cross-section of a lower plate of a microfluidic dialysis module according to an embodiment of the present disclosure.

The lower plate 20 may be disposed such that the top surface 22 is in contact with the membrane 30, and the lower flow path 23 may be formed on the top surface 22 of the lower plate 20 so that mass exchange between the first fluid and the second fluid may be smoothly performed in relation to the upper plate 10.

More specifically, the lower flow path 23 may be formed as a hole or groove structure formed in a shape of a predetermined depth on the top surface 22 of the lower plate 20 toward the bottom surface 24 of the lower plate 20.

However, it is not necessarily limited thereto, and the lower flow path 23 is not limited to being formed in a protruding form on the top surface 22 of the lower plate 20.

The lower flow path 23 may be formed so that one surface is exposed on the top surface 22 of the lower plate 20 for smooth mass exchange.

For example, the lower flow path 23 may be formed such that the top surface thereof is exposed on the top surface 22 of the lower plate 20, as shown in FIG. 8.

Accordingly, the top surface of the lower flow path 23 may be in direct contact with the membrane 30, and the second fluid flowing in the lower flow path 23 may interact with the first fluid through the top surface of the lower flow path 23 via the membrane 30.

In addition, the lower flow path 23 may extend by switching directions at least twice within the lower plate 20 to increase the contact area compared to the length of the lower plate 20.

Referring to FIG. 8, the lower flow path 23 may include a lower diffusion flow path 232 formed by switching directions at least twice.

At this time, the lower diffusion flow path 232 may be formed in a serpentine structure that moves to the left and reciprocates in the vertical direction, as shown in the drawing.

This is to ensure that the upper diffusion flow path 132 has a longer length than the area of the bottom surface 14 of the upper plate 10, and does not necessarily have to be formed as a flow path with the same path as shown in FIG. 5.

For example, in addition to the structure shown in FIG. 8, the lower diffusion flow path 232 may be formed in a serpentine structure moving downward or upward and reciprocating in the left and right directions, and may be formed in a structure including a plurality of curves.

Such lower diffusion flow path 232 may be formed in plural.

Referring to FIG. 8, the microfluidic dialysis module 1 according to an embodiment of the present disclosure may include eight lower diffusion flow paths 232, but is not limited thereto.

For example, the microfluidic dialysis module 1 according to another embodiment of the present disclosure may be formed to include four lower diffusion flow paths 232 or sixteen lower diffusion flow paths 232.

The plurality of lower diffusion flow paths 232 may be fluidly separated without being connected to each other.

In this case, the plurality of lower diffusion flow paths 232 fluidly separated from each other may be disposed at positions corresponding to the upper diffusion flow paths 132.

Accordingly, when the upper diffusion flow paths 132 and the lower diffusion flow paths 232 are formed in the same number, the lower diffusion flow paths 232 may be disposed at the vertical lower sides of each of the upper diffusion flow paths 132.

In this case, the first fluid flowing in the upper diffusion flow path 132 and the second fluid flowing in the lower diffusion flow paths 232 may be subjected to mass exchange with the membrane 30 interposed therebetween.

In this process, the concentration of the internal impurities of the first fluid flowing in the upper flow path 13 may be gradually lowered, so that the second fluid flowing in each lower diffusion flow path 232 exchanges mass with the first fluid containing different concentrations of impurities.

In this case, since the plurality of lower diffusion flow paths 232 are fluidly separated from each other, when the first fluid is moved entirely from left to right in the upper flow path 13, the concentration of the lower diffusion flow paths 232 disposed relatively to the right is not affected by this even if mass exchange occurs first in the lower diffusion flow paths 232 disposed relatively to the left.

Accordingly, the second fluid flowing in the lower diffusion flow path 232 disposed relatively to the right is easier to maintain a larger difference in concentration of impurities in relation to the first fluid than in the lower diffusion flow path 232 disposed relatively to the left.

As such, as the concentration gradient of the impurities is maintained to be large, purification according to the concentration difference may be smoothly performed even if the first fluid flowing in the upper flow path 13 is mass-exchanged with the second fluid and the concentration of the impurities is lowered.

In this case, a lower flow path inlet 231 may be positioned at one end of each of the lower diffusion flow paths 232, and a lower flow path outlet 233 may be positioned at the other end of each of the lower diffusion flow paths 232.

Accordingly, the second fluid introduced into each lower flow path inlet 231 may flow out of each lower flow path outlet 233 through each lower diffusion flow path 232 connected to the lower flow path inlet 231 in the lower flow path 23, thereby forming a second fluid flow.

In this case, the flow of the second fluid may be performed in a direction opposite to that of the first fluid as a whole.

For example, when the flow of the first fluid of the microfluidic dialysis module 1 according to an embodiment of the present disclosure is generally in the direction from left to right, the flow of the second fluid may be generally in the direction from right to left.

At this time, in the microfluidic dialysis module 1 according to an embodiment of the present disclosure, the lower flow path inlet 231 may be disposed in the positive direction of the x-axis relative to the lower flow path outlet 233, that is, on the right side.

In this case, in FIG. 8, the lower flow path inlet 231 is shown to be disposed in the positive direction of the y-axis relative to the lower flow path outlet 233, that is, on the front side, but is not limited thereto.

For example, it is not limited that the lower flow path inlet 231 is disposed in the negative direction of the y-axis relative to the lower flow path outlet 233, that is, on the rear side.

According to such a structure, in the microfluidic dialysis module 1 according to an embodiment of the present disclosure, the flow of the second fluid is formed in the direction from the right side to the left side as a whole.

Referring to FIGS. 7 and 9, a lower inlet 25 for introducing the second fluid into the lower flow path 23 and a lower outlet 27 for discharging the second fluid out from the lower flow path 23 may be formed on the bottom surface of the lower plate 20.

The lower inlet 25 may be formed below the lower flow path inlet 231, and the lower outlet 27 may be formed below the lower flow path outlet 233.

Referring to FIGS. 2 and 3, a second fluid supply pipe 66 fluidly connected to a second fluid supply portion 62 through a second fluid supply flow path 61 may be connected to the lower inlet 25.

Accordingly, the second fluid is introduced into the lower inlet 25 from the second fluid supply pipe 66, and the second fluid introduced into the lower inlet 25 may be introduced into the lower flow path 23 through the lower flow path inlet 231 via the lower inlet 25.

Likewise, referring to FIGS. 2 and 3, a second fluid discharge pipe 68 fluidly connected to a second fluid discharge portion 64 through a second fluid discharge flow path 63 may be connected to the lower outlet 27.

Therefore, the second fluid flowing in the lower flow path 23 may be discharged to the second fluid discharge pipe 68 through the lower outlet 27 via the lower flow path outlet 233, and the second fluid discharged to the second fluid discharge pipe 68 may be moved to the second fluid discharge portion 64 via the second fluid discharge flow path 63.

At this time, since the lower flow path inlet 231 of the microfluidic dialysis module 1 according to an embodiment of the present disclosure may be disposed rearward on the top surface 22 of the lower plate 20 than the lower flow path outlet 233, accordingly, the second fluid supply pipe 66 may be disposed rearward than the second fluid discharge pipe 68.

In addition, the lower diffusion flow path 232 is provided in plural numbers and maintains a fluidly separated state without being connected to each other, accordingly, the lower flow path inlet 231 and the lower flow path outlet 233 may be formed in plural numbers.

Accordingly, the second fluid supply flow path 61 fluidly connected to the second fluid supply portion 62 may be branched into plural numbers and connected to the plurality of second fluid supply pipes 66, and the plurality of second fluid supply pipes 66 may be connected to the plurality of lower flow path inlets 231, respectively.

Similarly, the second fluid discharge portion 63 fluidly connected to the second fluid discharge portion 64 may be branched into plural numbers and connected to the plurality of second fluid discharge pipes 68, and the plurality of second fluid discharge pipes 68 may be connected to the plurality of lower flow path outlets 233, respectively.

FIG. 9 is a cross-sectional view illustrating a cross-section of a lower plate of the microfluidic dialysis module according to an embodiment of the present disclosure.

Referring to FIG. 9, the lower inlet 25 and the lower outlet 27 may be formed to extend by a predetermined depth from the bottom surface 24 toward the top surface 22 of the lower plate 20, and the lower flow path inlet 231 and the lower flow path outlet 233 may be formed to extend by a predetermined depth from the top surface 22 toward the bottom surface 24 of the lower plate 20.

As described above, since the lower inlet 25 and the lower outlet 27 may be positioned below the lower flow path inlet 231 and the lower flow path outlet 233, so that the height direction ends of the lower inlet 25 and the lower outlet 27 may be formed to communicate with the height direction ends of the lower flow path inlet 231 and the lower flow path outlet 233.

Accordingly, the lower plate 20 may be penetrated in the vertical direction by the lower inlet 25 and the lower flow path inlet 231, and may be penetrated in the vertical direction by the lower outlet 27 and the lower flow path outlet 233.

In this case, the widths of the lower inlet 25 and the lower outlet 27 may be formed to be wider than the widths of the lower flow path inlet 231 and the lower flow path outlet 233.

In the microfluidic dialysis module 1 according to an embodiment of the present disclosure, the lower flow path 23 has the lower flow path inlet 231 and the lower flow path outlet 233 at one end and the other end, respectively, and the lower inlet 25 and although the lower outlet 27 has been described as being disposed vertically below the lower flow path inlet 231 and vertically below the lower flow path outlet 233, respectively, but are not necessarily limited thereto.

For example, each of the lower diffusion flow paths 232 may not separately include the lower flow path inlet 231 and the lower flow path outlet 233 at one end and the other end, and the lower inlet 25 and the lower outlet 27 may be formed to be connected to different points of the lower diffusion flow path 232 rather than one end and the other end of the lower diffusion flow path 232, respectively.

In the upper plate 10 according to the above, a plurality of the fastening holes 11 may be formed to in the vertical direction penetrate the upper plate 10 in order to couple one or more fixing members 40.

In this case, the fixing member 40 may penetrate the upper plate 10 and the lower plate 20 together to couple the upper plate 10 and the lower plate 20.

Accordingly, a fastening hole 21 may be formed on the top surface 22 and the bottom surface 24 of the lower plate 20 at a position corresponding to the position where the fastening hole 11 of the upper plate 10 is formed.

In this case, the fastening hole 11 of the upper plate 10 may be formed by the head coupling portion 111 and the through portion 113 to which the screw head of the fixing member 40 may be coupled so that the fixing member 40 may be stably coupled, but the screw head of the fixing member 40 is not coupled to the fastening hole 21 of the lower plate 20, so that the fastening hole 21 of the lower plate 20 may be formed in a shape corresponding to the through portion 113 of the fastening hole 11 of the upper plate 10.

The shape of the fastening hole 21 is exemplary, and when the fixing member 40 passes through the upper plate 10 and the lower plate 20 from the lower side toward the upper side, the shape of the fastening hole 21 may be differently formed.

When the upper plate 10 and the lower plate 20 are coupled to each other with the membrane 30 interposed therebetween, the fastening holes 11 and 21 may be disposed near the edges of the upper plate 10 and the lower plate 20 to prevent the leakage of the first fluid or the second fluid to the outside.

For example, as illustrated in FIGS. 1 to 9, a plurality of fastening holes 11 may be formed to be spaced apart from each other near the edges of the top surface 12 and the bottom surface 14 of the upper plate 10, which are close to the side surface 19 of the upper plate 10.

Likewise, a plurality of fastening holes 21 may be formed to be spaced apart from each other near the edges of the top surface 22 and the bottom surface 24 of the lower plate 20, which are close to the side surface 29 of the lower plate 20.

In addition, to the edges of the upper plate 10 and the lower plate 20, the fastening holes 11 and 21 may be formed in the center of the upper plate 10 and the lower plate 20 or in the vicinity of the upper flow path 13 and the lower flow path 23.

Referring to FIG. 5, in the microfluidic dialysis module 1 according to an embodiment of the present disclosure, fastening holes 11 may be disposed between two upper diffusion flow paths 132 of the upper plate 10, that is, near a place where the upper connection flow path 134 is formed, respectively.

In addition, the fastening hole 21 may be disposed in a portion between the plurality of lower diffusion flow paths 232 of the lower plate 20, respectively.

This way, when the fastening holes 11 and 21 are disposed between the plurality of upper diffusion flow paths 132 and the lower diffusion flow paths 232, the first fluid and the second fluid flowing in the upper diffusion flow paths 132 and the lower diffusion flow paths 232 may be prevented from leaking out of the upper diffusion flow paths 132 and the lower diffusion flow paths 232 in the lateral direction, respectively.

Accordingly, the movement paths of the first fluid and the second fluid may be strictly controlled, and the problem of mixing the fluid in the unexpected path or leaking out of the flow path may be prevented.

The purification method according to an embodiment of the present disclosure is a method of purifying a drug delivery system or biopharmaceutical using the microfluidic dialysis module.

In the present disclosure, it has been demonstrated that the method for multiply injecting buffer solution into the microfluidic dialysis module described above continuously reproduces concentration gradients to increase the efficiency of mass transfer by comparing them with other methods such as single buffer injection and other batch dialysis and diafiltration.

For example, an MBI-8 dialysis method achieves an excellent elimination rate (<1%) for ethanol and unencapsulated drugs (DOX and CCM), while reaching a target pH of 7.4 in just 15 minutes. These results were due to a significant reduction in the coexistence time between liposomes and ethanol, preserving essential liposome properties including size 52 nm, PDI value 0.11, $EE_{DOX}$ and $EE_{CCM}$ values of 74% and 94%, respectively. On the other hand, in conventional batch dialysis and diafiltration method, the particle size was 70 nm or more, and the PDI value was 0.2 or more. Based on these results, it was confirmed that ultrafast dialysis is necessary to maintain the properties of liposomes as drug delivery systems.

Therefore, the microfluidic dialysis module according to the present disclosure is an optimized form for the purification of drug delivery systems or biopharmaceuticals, and a solvent containing drug delivery systems or biopharmaceuticals may be injected into the upper flow path of the microfluidic dialysis module, and a buffer solution for dialysis may be injected into the lower flow path.

In the present disclosure, the drug delivery systems include liposomes, lipid-based nanoparticles, polymer-based nanoparticles, inorganic-based nanoparticles, or protein-based nanoparticles, but is not limited thereto.

In the present disclosure, the polymer-based nanoparticles may be prepared from any one or more selected from the group consisting of Poly(lactic-co-glycolic acid), Polyethylene glycol, Poly(ethylene oxide), Poly(ε-caprolactone), Chitosan, Hydrogels, Poly(vinyl alcohol), Poly(methyl methacrylate), and Polyethyleneimine, but is not limited thereto.

In the present disclosure, the inorganic-based nanoparticles may be prepared from any one or more selected from the group consisting of silica, porous silica, calcium phosphate and gold, but is not limited thereto.

In the present disclosure, the protein-based nanoparticles may be prepared from any one or more selected from the group consisting of albumin, collagen, gelatin and fibrin, but is not limited thereto.

The liposomes, lipid-based nanoparticles, polymer-based nanoparticles, inorganic-based nanoparticles, or protein-based nanoparticles used as the drug delivery systems are encapsulated with various drugs, and for example, they may be selected from the group consisting of ionic drugs, nucleic acid drugs, protein drugs, and combinations thereof, but are not limited thereto. The types of the drugs are not particularly limited, and for example, they may be selected from antipsychotic drugs such as dementia drugs, Parkinson's disease drugs, anti-cancer drugs, anti-anxiety drugs, antidepressants, tranquilizers and psychotropic drugs; cardiovascular medications such as hyperlipidemia medications, hypertension medications, hypotensive medications, anti-thrombotics, vasorelaxants and arrhythmia medications; epilepsy drugs; gastrointestinal drugs, such as anti-ulcer drugs; rheumatoid drugs; antispasmodics; anti-tuberculosis medications; muscle relaxants; osteoporosis medications; treatment for erectile dysfunction; hemostats; hormones agents such as sex hormones; diabetes medication; antibiotics; antifungals; antivirals; antipyretic analgesic; autonomic modulators; corticosteroids; diuretics; antidiuretic; painkiller; anesthetic; antihistamines; antiprotozoals; anti-anemia; anti-asthmatics; anticonvulsant; antidote; anti-migraines; antiemetics; antiparkinsonian; antiepileptic; antiplatelet agent; antitussive expectorant; bronchodilator; cardiac; immunomodulators and mixtures thereof.

In one specific embodiment of the present disclosure, the efficiency of purification of liposomes encapsulated with doxorubicin and curcumin, which are representative anticancer agents, was evaluated using the microfluidic dialysis module according to the present disclosure. As a result, it was confirmed that the residual ethanol was significantly reduced to less than 0.5% at a short time compared to MBI-1, batch dialysis, and diafiltration, and the pH reached neutral (pH 7.2~7.4) and achieved a high recovery rate of <98%. In addition, it was confirmed that the most excellent efficiency was shown in five aspects: production performance index (Q=size–1PDI–1, product of the reciprocal of diameter (d, nm) and PDI value of LBNP), buffer saving (BS), drug preservation capability (DPC), time saving (TS), and liposome recovery (R).

In the present disclosure, the term "biopharmaceutical" refers to drugs developed using cells, tissues, and hormones derived from humans or other organisms, and includes biological agents, vaccines, blood products, genetic recombinant drugs, cell culture medicines (including protein medicines and antibody medicines), cell therapeutic agents, gene therapeutic agents, and the like, but is not limited thereto.

In one specific embodiment of the present disclosure, the efficiency of purification of laccase-containing fermentation broth was evaluated using the microfluidic dialysis module according to the present disclosure. As a result, it was confirmed that all impurities were removed in a short time compared to MBI-1, batch dialysis, and diafiltration, the pH reached neutral (pH 7.2~7.4) and achieved a high enzyme recovery rate of 95%<.

Therefore, through the purification method according to the present disclosure, impurities may be efficiently removed from the drug delivery systems or biopharmaceuticals, and the drug delivery systems or biopharmaceuticals can be obtained at a high recovery rate while reaching the target pH of 7.4 in a short time. The impurities may be any one or more selected from the group consisting of alcohol solvents, unencapsulated drugs, nucleic acids and peptides.

In the purification method of the present disclosure, the type of buffer solutions for dialysis injected into the lower flow path may be phosphate buffered saline (PBS), hydroxyethyl piperazine Ethane Sulfonic acid (HEPES), tris(hydroxymethyl)aminomethane (Tris), and the like, but is not limited thereto.

In the purification method of the present disclosure, the solvent containing the drug delivery systems or biopharmaceuticals injected into the upper flow path may be replaced with the buffer solutions injected into the lower flow path through salt exchange between the flow of the solvent containing the drug delivery systems or biopharmaceuticals injected into the upper flow path and the flow of the buffer solutions injected into the lower flow path.

For example, in the case of using a buffer solution that may be injected into the human body as a buffer solution for dialysis injected into the lower flow path, the solvent containing the drug delivery systems or biopharmaceuticals injected into the upper flow path can be replaced with the buffer solution capable of being injected into the human body through salt exchange between the flow of the solvent containing the drug delivery systems or biopharmaceuticals injected into the upper flow path and the flow of the buffer solutions injected into the lower flow path so that the drug may be administered to the human body immediately after purification.

In the purification method of the present disclosure, the flow rate ratio (FRR) of a solvent including drug delivery systems or biopharmaceuticals injected into the upper flow path and a buffer solution injected into the lower flow path of the microfluidic dialysis module may be 1 to 32, preferably 1 to 16, more preferably 6 to 10, but is not limited thereto. For example, the flow rate ratio may be increased to 32 or more. At this time, the height of the channels may be adjusted in the range of 50 to 300 μm, but is not limited thereto.

The method of purifying drug delivery systems or biopharmaceuticals using the microfluidic dialysis module of the present disclosure may represent recovery rate of drug delivery systems or biopharmaceuticals of 95% or more.

The pH of the solvent containing drug delivery systems and biopharmaceuticals purified by the method of purifying drug delivery systems or biopharmaceuticals using the microfluidic dialysis module of the present disclosure may be 7.2 to 7.4.

In the present disclosure, when the drug delivery systems are a liposome or lipid-based nanoparticle, the drug delivery systems purified by the purification method using the microfluidic dialysis module may maintain the initial encapsulation efficiency, initial particle size, and initial polydispersity index of the drug.

In the present disclosure, the method for purifying drug delivery systems or biopharmaceuticals using the microfluidic dialysis module may reduce the use amount and purification time of a buffer solution for dialysis compared to the method for purifying drug delivery systems or biopharmaceuticals using batch dialysis or diafiltration.

Specifically, the performance efficiency of the purification method of the present disclosure may be comprehensively considered in five aspects: production performance index (Q=size$^{-1}$ PDI$^{-1}$, product of the reciprocal of diameter (d, nm) and PDI value of LBNP), buffer saving (BS), drug preservation capability (DPC), time saving (TS), and liposome recovery (R).

The method purifying the drug delivery systems using the microfluidic dialysis module of the present disclosure may exhibit at least one of the following properties a) to e) compared to a method purifying the drug delivery systems using batch dialysis or diafiltration: a) increase a production performance index defined by the product of a reciprocal of diameter of the drug delivery system particle and a polydispersity index value of the drug delivery system, b) decrease buffer solution usage, c) increase drug preservation capability, d) decrease purification time, and e) increase recovery rate of drug delivery system.

The drug delivery system purified by the purification method according to an embodiment of the present disclosure may be a drug loaded liposome, a cationic liposome or a high concentration lipid nanoparticle, but is not limited thereto. In this case, the drug loaded liposome may be not only a single drug but also a liposome (e.g., a dual-drug loaded liposome) loaded with two or more drugs.

The drug delivery system purified by the purification method according to the present disclosure may have a higher cell uptake rate compared to the drug delivery system purified by batch dialysis or diafiltration.

In addition, the drug delivery system purified by the purification method according to the present disclosure may maintain the initial particle size and the initial polydispersity index even after an aging period of 7 days or more at low temperature (4° C.). The aging period may be 16 hours or more, 1 day or more, 1 week or more, 2 weeks or more, 3 weeks or more, or 1 month or more after freeze drying, and the initial encapsulation efficiency may be maintained even after such an aging period.

Hereinafter, the present disclosure will be described in more detail with reference to the examples. It will be apparent to those skilled in the art that these examples are merely illustrative of the present disclosure, and the scope of the present disclosure is not interpreted as being limited by these examples.

Preparation Example

Ingredient

Regenerated cellulose (RC) membranes with a molecular weight cutoff (MWCO) of 12 kDa were purchased from Spectra/por. Amicon® Ultra-15 with a 100 kDa membrane was purchased from Merck Millipore. Ethyl alcohol (EtOH), sodium acetate solution, cholesterol (Chol), doxorubicin hydrochloride (DOX), citric acid, sodium citrate tribasic dihydrate, phosphate buffered saline (PBS), 2,2'-azino-bis (3-ethylbenzothiazoline-6-sulfonic acid (ABTS), and Bradford reagent were purchased from Sigma-Aldrich. 1-palmitoyl-2-oleoyl-sn-glycero-3-phosphocholine (POPC), 1,2-di-(9Z-octadecenoyl)-sn-glycero-3-phosphate (18 PA), 1,2-distearoyl-sn-glycero-3-phosphocholine (DSPC), 1,2-dimyristoyl-rac-glycero-3-methoxypolyethylene glycol-2000 (DMG-PEG2000), and 1,2-diolcoyl-3-trimethylammonium-propane (DOTAP) were purchased from Avanti Polar Lipids, Inc. Cucumin (CCM) was purchased from Thermo Fisher Scientific. Heptadecane-9-yl 8-((2-hydroxyethyl)(6-oxo-6-(undecyloxy)hexyl)amino)octanoate (SM-102) was purchased from Xiamen Sinopeg Biotech CO. LTD. A diameter of 1 mm polytetrafluoroethylene (PTFE) tube was purchased from IDEX HEALTH & SCIENCE (WA, USA). PHD Ultra and Legato 200 were purchased from Havard Apparatus and KD science, respectively. MCP-Standard, which is a peristaltic pump, was purchased from ISMATEC.

Preparation Example 1

MBI-N Production

The MBI-N device was fabricated by sandwiching an RC membrane with an MWCO of 12 kDa between stainless steel plates featuring a precisely designed serpentine microfluidic channel. The channel was designed using AutoCAD software, and then milled into the stainless steel sheet using computer numerical control (CNC) machining. The Channel were fabricated with a standardized 1 mm width and various heights of 100/or 300 mm. To maintain a consistent channel volume of 750 μL, a channel length was 2.5 m when a channel height was 300 μm, and a channel length was 7.5 m when a channel height was 100 μm. The serpentine pattern of the channel enabled efficient packing. The buffer channel and the sample channel are symmetrically patterned, and the length of each individual buffer channel was set by dividing the total length of the sample channel by N. Through this design, the sample channel length and the entire total buffer channel length were made to be the same. The RC membrane was hydrated with deionized water (DI) for an hour and then secured between two stainless steel plates using screws.

Preparation Example 2

Purification Using MBI-N

Sample (LBNP or biotherapeutic mixture) flow rate was set in consideration of residence time and injected through the sample inlet using a syringe pump. PBS (pH 7.4, 10 mM) was injected into the N buffer channel using a combination of a syringe pump and a peristaltic pump, taking into account the FRR value between the sample flow rate and the PBS flow rate. All flows were continuously injected, and the sample outlet was directly connected to the online GC sample loop to prevent ethanol evaporation to accurately measure the amount of remaining ethanol. In addition, an additional 3 mL of the sample collected during GC analysis were used for pH analysis.

Experimental Example 1

Online GC Operations

The remaining ethanol in the sample was quantified using Varian GC-450 equipped with a flame ionization detector and using a CP-Volamine column (0.32 mm×60 m; initially heated at 45° C. at a rate of 30° C./min). A sample purified with MBI-N containing ethanol was directly introduced into Varian GC-450 and passed through a sample loop of 10 μL volume through a 6-port valve. When the valve rotates, the sample in the sample loop enters the GC column along with the carrier gas.

Experimental Example 2

Purification Through Batch Dialysis and Diafiltration

For batch dialysis, 3 mL of sample (LBNP or biological therapeutic agent mixture) was placed in a dialysis bag (MWCO, molecular weight of cut-off 12 kDa) and dialyzed using 3000 mL of PBS. To perform diafiltration, 3 mL of LBNP and 12 mL of PBS were loaded into a filtration unit (Amicon® Ultra-15, 100 kDa membrane), and centrifuged at 3900 rpm for 40 minutes. After excluding the residue (concentrate), the remaining space was filled with PBS and centrifugation was repeated. Each purification process was performed until the pH of the sample reached 7.4 and the ethanol concentration was less than 0.5% (v/v).

Experimental Example 3

Characteristics of LBNP

To measure the size (distribution) of LBNP, dynamic light scattering (DLS) analysis was performed using Zetasizer Nano ZS (Malvern Instruments, Ltd.). The encapsulation efficiency of DOX and CCM in purified liposome samples was determined by diluting them 10 times with methanol to effectively destroy the liposome structure and release the drugs. To separate the overlapping spectra of CCM (420 nm) and DOX (485 nm), machine learning technology was used. Solutions containing various concentrations of CCM and DOX were prepared by dissolving both compounds in methanol. UV intensity at 420 nm and 485 nm were measured for each solution. Subsequently, linear regression analysis was performed in Python (scikit-learn) to calculate the R-squared (R2) values for the two intensities with respect to drug concentration. The linear regression was repeated 10,000 times for 30 different solutions, and the average R2 value exceeded 0.99. Once the model is trained, it may be used to measure the concentrations of CCM and DOX based on the respective absorbance values of the overlapping spectra.

Experimental Example 4

Liposome Recovery Measurements

In order to remove all solvents, the weight of the purified liposomes obtained through freeze drying was measured to evaluate the recovery rate of liposomes. Considering the distinct encapsulation efficiency across the four purification methods, the weight of the drug was subtracted from the freeze-dried sample. The calculation of the liposome recovery rate involved comparing the measured liposome weight with the weight at 100% recovery. To ensure reliability, the experiment was repeated three times.

Experimental Example 5

Cell Culture

Samples were prepared in PBS so that the final concentration of drug in each sample was maintained at 10 µg/mL. Human cervical cancer cell line HeLa cells were cultured in DMEM containing 10% (v/v) fetal bovine serum (FBS) supplemented with 100 U/mL penicillin and 100 µg/mL streptomycin. The cells were cultured in an incubator at 37° C. under an atmosphere of 5% co2 and 90% relative humidity.

Experimental Example 6

Cell Uptake Assay

Cell uptake studies were conducted using confocal laser scanning microscopy (CLSM) and flow cytometry. For CLSM analysis, HeLa cells were seeded at a density of 1×104 cells and allowed to grow at the cover slip in the presence of a control group and a prepared sample. After 4 hours of incubation, the cells were washed with PBS and fluorescence images with an excitation wavelength of 488 nm and an emission wavelength of 600 nm were acquired using a confocal laser scanning microscope (Leica SP5). HeLa cells (1×104 cells per well) were cultured in a 96-well plate for 24 hours, and then treated with prepared samples and controls to perform flow cytometry. After 4 hours of treatment, the cells were separated by trypsin treatment, washed three times with PBS, and studied using a flow cytometer CytoFLEX (Bechman Coulter, California, United States) using PE channels, and analyzed with CytExpert software.

Experimental Example 7

Cytotoxicity Assay

The cytotoxicity of liposome encapsulated drugs was evaluated by performing cell viability and survival/dead cell imaging analysis. The cell survival rate was measured by standard cell proliferation-based MTS assay, and HeLa cells were seeded at a density of 1×104 cells per well in a 96-well plate and cultured for 24 hours for cell attachment. Then, the consumed nutrient medium was replaced with prepared samples obtained from batch dialysis, diafiltration, MBI-1 and MBI-8, and an appropriate control group was used. After 24 hours of treatment, MTS reagent was added and further incubated for 4 hours. The samples were mixed carefully using a 96-well plate mixer and the absorbance at 490 nm was analyzed using a microplate reader (MRX A2000, K Lab Co., Ltd., South Korea). The images of live and dead cells of Hela cells treated with encapsulated drugs were examined by staining the cells with Calcein AM and propidium iodide (PI) dye. HeLa cells were grown in coverslips at a density of 1×104 cells per coverslip and treated with prepared drug samples. After 24 hours of treatment, cells were washed with PBS buffer, stained with calcein-AM (10 µm) for 20 minutes, and then washed with PBS again. Then, the cells were stained with PI (10 µg/mL), cultured for 20 minutes, and washed. The stained cells were observed with a confocal microscope.

Experimental Example 8

Preparation and Analysis of Laccase Sample

Laccase samples were prepared by adding laccase at a concentration of 10 mg/mL to fermentation broth. In order to make the fermentation broth, the *E. coli* K-12 bacterial culture was placed in 25 mL of nutrient broth and cultured under sterile conditions at 37° C. and 100 rpm for 24 hours. After culturing, the resulting fermentation broth was centrifuged at 8000 rpm for 10 minutes, the supernatant was collected to discard the cell pellet. Then, laccase was added to the fermentation broth. After the purification process, protein concentration was measured using the Bradford method using BSA as the standard. The absorbance at 595 nm was measured for the samples compared to each blank solution. The enzymatic activity was evaluated by observing the absorbance at 420 nm after oxidation of the substrate ABTS salt (1 mM) in sodium acetate buffer (pH 5, 100 mM). For both analyses, a UV-vis spectrophotometer (NanoDrop 2000c, Thermo Fisher Scientific) was used.

Example 1

Design of Microfluidic-Multiple Buffer Injector for Flow-Dialysis

Figure 10A:
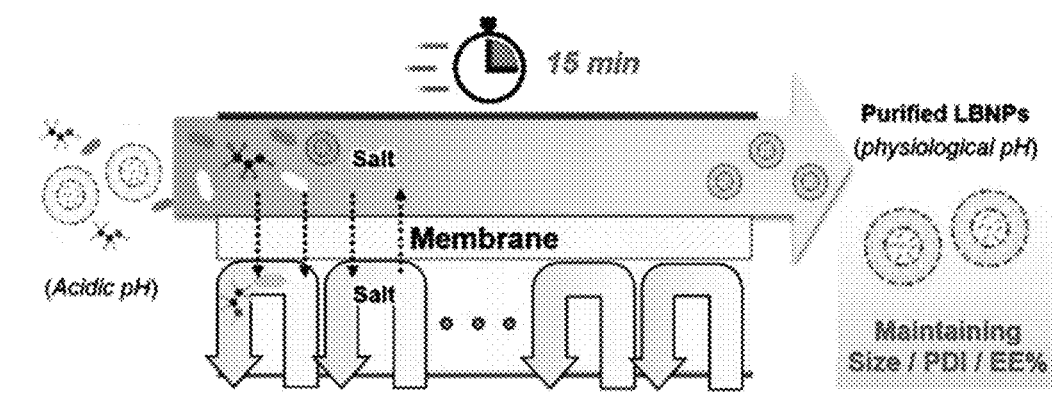
FIGS. 10A to 10D illustrate design, fabrication, and impurity removal performance of a multiple buffer injector (MBI).

The present inventors devised a remarkable concept of MBI by utilizing the advantage of continuously reproducing the concentration gradient between the sample and the buffer, along with improved mass transfer due to minimizing the diffusion distance in the microfluidic channel. As expected from the first rule of Fick, this approach ultimately results in a significant increase in flux (J) and provides a powerful means to promote mass transfer in the microfluidic system (FIG. 10A).

The concept of multiple buffer injection (MBI) was first verified through computational fluid dynamics (CFD) simulation. First, a dual channel device was designed in which a membrane (with a porosity of 70%) was inserted between upper channel for sample injection and lower channel for buffer injection. Ethanol at a concentration of 25% v/v, which is the highest concentration used for LBNP synthesis, was selected as the impurity to be removed, and the flow rate ratio (FRR) of the buffer to ethanol solution for ethanol removal efficiency was set to 4. Effects of sample residence time (0.5, 1, 5 and 15 minutes), buffer flow direction (co-flow, counter-flow) and MBI number (MBI-N, where N represents the number of buffer injectors) were investigated.

In order to investigate the diffusion-based mass transfer efficiency, the microfluidic-multiple buffer injector was simulated using the chemical reaction engineering module, particularly COMSOL Multiphysics software including the Transport of Diluted Species module. The design of MBI-N consisted of membrane with a porosity of 70% and thickness of 100 µm sandwiched between the upper channel (for the ethanol solution injection) and the lower channel (for the multiple buffer injection). The channel height was 300 µm. In the case of the lower channel, total length of the channel was equally divided by N to allow the N times injection of fresh buffer. The residence time of the ethanol solution was varied from 0.5 min to 15 min by controlling the linear velocity of ethanol solution. To investigate the mass transfer across the upper channel, membrane, and lower channel, the following ordinary differential equations (ODE) were utilized.

1) Fick's Diffusion Law

In the context of molecular diffusion, the Fick's law equation presented in Equations 1 and 2 was used.

$$\nabla \cdot J_i + u \cdot \nabla c_i = R_i \qquad \text{[Equation 1]}$$

$$J_i = -D_i \nabla c_i \qquad \text{[Equation 2]}$$

In Equations 1 and 2, $J_i$, u, and $c_i$ stands for diffusion flux, fluid velocity, and concentration respectively. In this case, the reaction term, $R_i$, is zero, and $D_i$ is the diffusion coefficient.

2) Flow Equations

The following equations 3 and 4 describe the preservation of momentum (Navier-Stokes equation) and the conservation of mass (continuity equation).

$$\rho u \cdot \nabla u = -\nabla p + \mu \nabla^2 u + \rho g \qquad \text{[Equation 3]}$$

$$p \nabla \cdot u = 0 \qquad \text{[Equation 4]}$$

In Equations 3 and 4, $\rho$ represents the density of fluid, u stands for the fluid linear velocity, p is the pressure, $\mu$ is the fluid dynamic viscosity, and g is the gravitational acceleration.

3) Boundary Conditions

Across the system's boundaries, there is no flow or flux ($-n \cdot J_i = 0$). The fixed initial concentration of ethanol solution is injected into the inlet of upper channels ($C_i = C_{0,i}$). When the concentration gradient at the outlet is 0, it represents a complete flow development ($n.D_i \nabla c_i = 0$). Finally, the outlet pressure is the same as the ambient pressure.

Figure 10B:
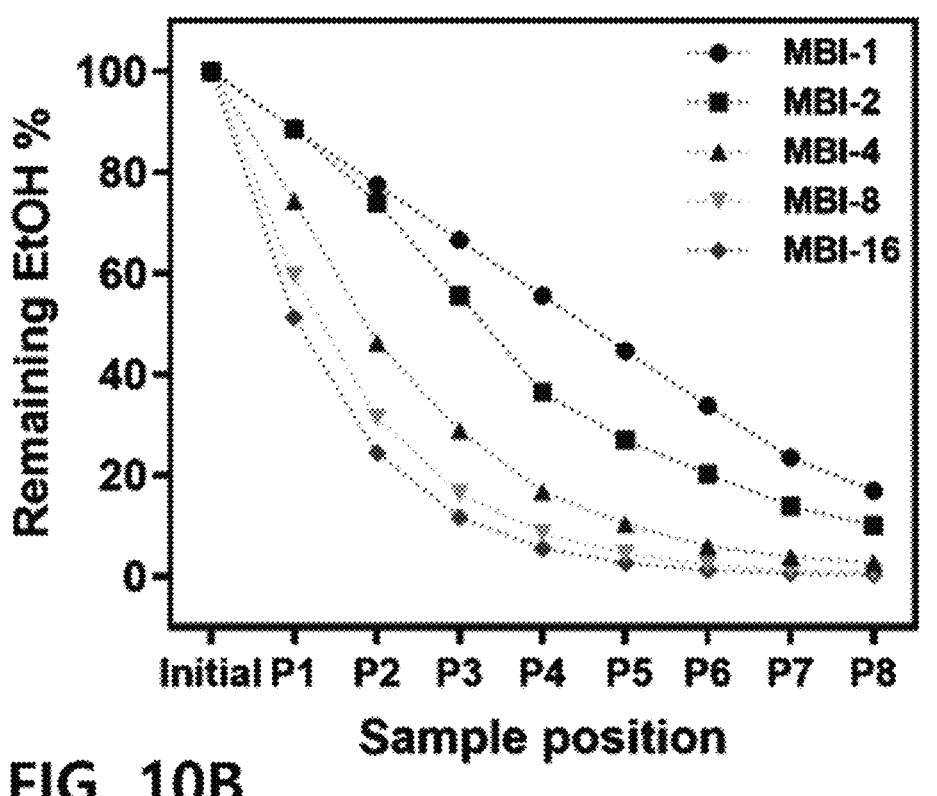
Figure 11A:
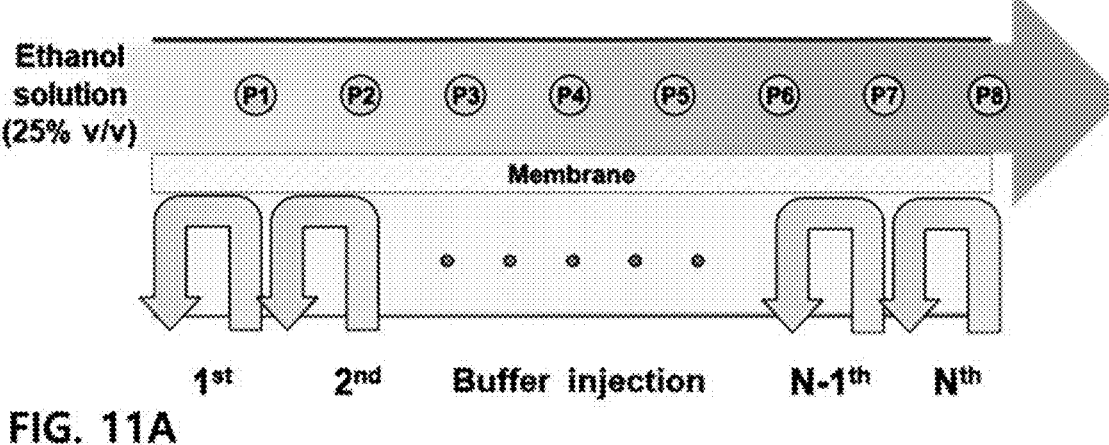
FIGS. 11A to 11C evaluate the ethanol removal ability using COMSOL.
Figure 11B:
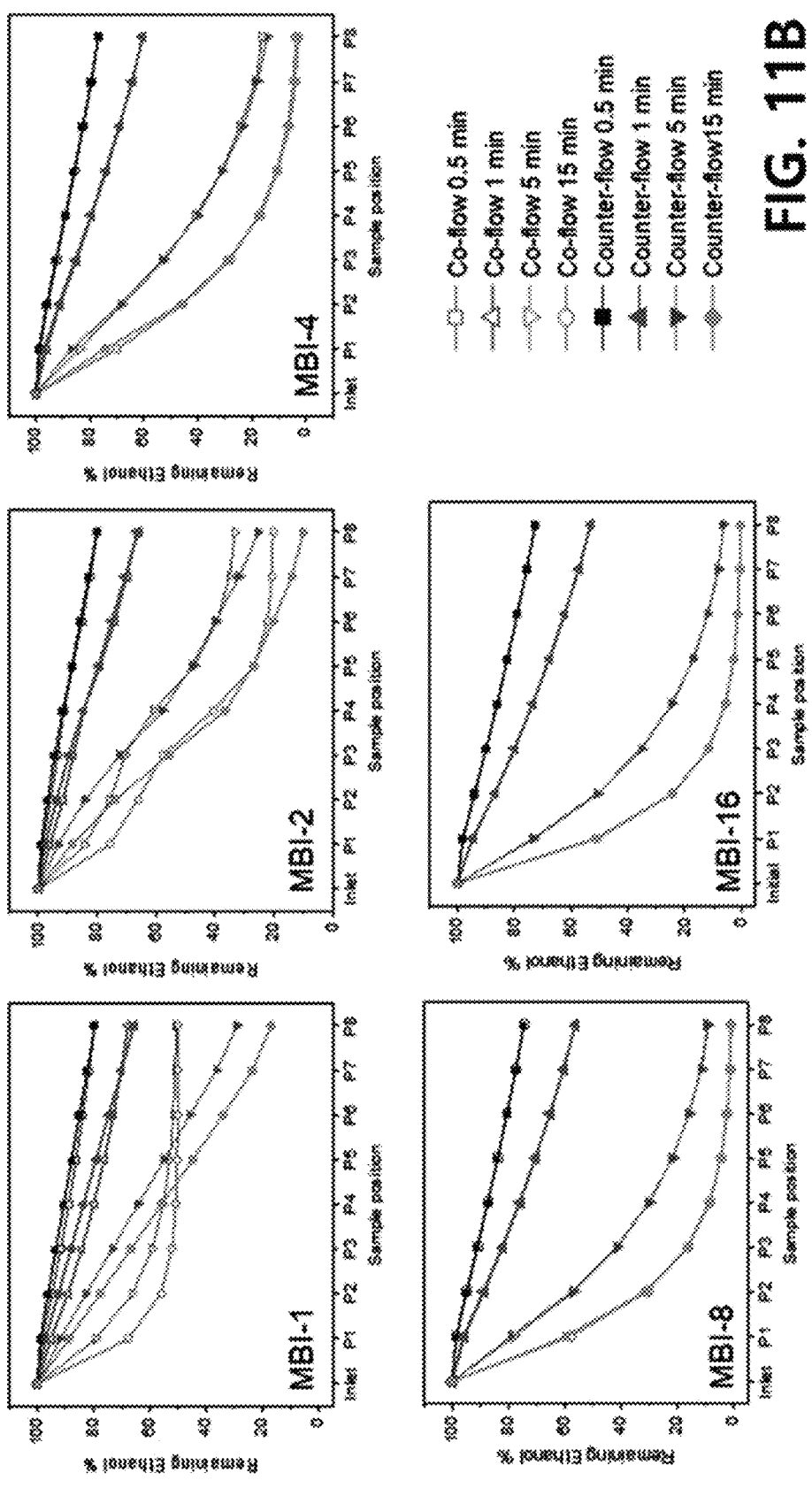
Figure 11C:
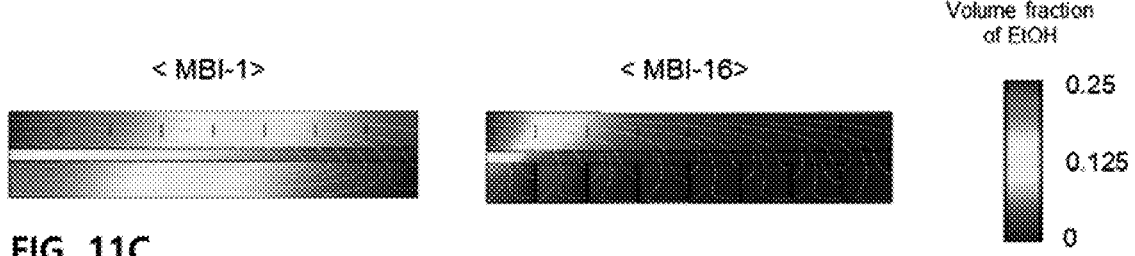

In addition, the sample channels were divided evenly and eight designated points (P1~P8) were placed to confirm the ethanol removal tendency (FIG. 11A). In the case of MBI-1, which a single buffer injector, the co-flow of fresh buffer in the lower channel at the beginning of sample injection (P1~P3) induced a larger concentration gradient and higher transfer of ethanol to the buffer flow than the counter-flow. However, it eventually reached equilibrium and maintained a high concentration (50.5%<) of ethanol at the outlet point (P8) under all residence time conditions. On the other hand, the counter-flow enabled continuous molecular exchange, enabling efficient ethanol removal from P8 to 16.9% within a residence time of 15 minutes (MBI-1 in FIG. 11B). As a result, the ethanol removal rate increased during the initial phase was started earlier due to the increase in the N in the counter-flow condition (FIGS. 10B, 11B and 11C). When the residence time of MBI-16 was 15 minutes, the ethanol content rapidly decreased, reaching a saturation point of 5.5% at P4 and ultimately decreasing to 0.39% at P8 (FIG. 10B). In addition, regardless of the value of N, the counter-flow condition provided excellent superior ethanol removal efficiency at P8 compared to the co-flow condition, but this difference decreased as N increased (FIG. 11B). Through the simulation results, it was confirmed that the increase in N of MBI greatly accelerated the molecular diffusion rate by the continuous reproduction of the concentration gradient, which had a significant effect on the impurity removal performance.

Figure 10C:
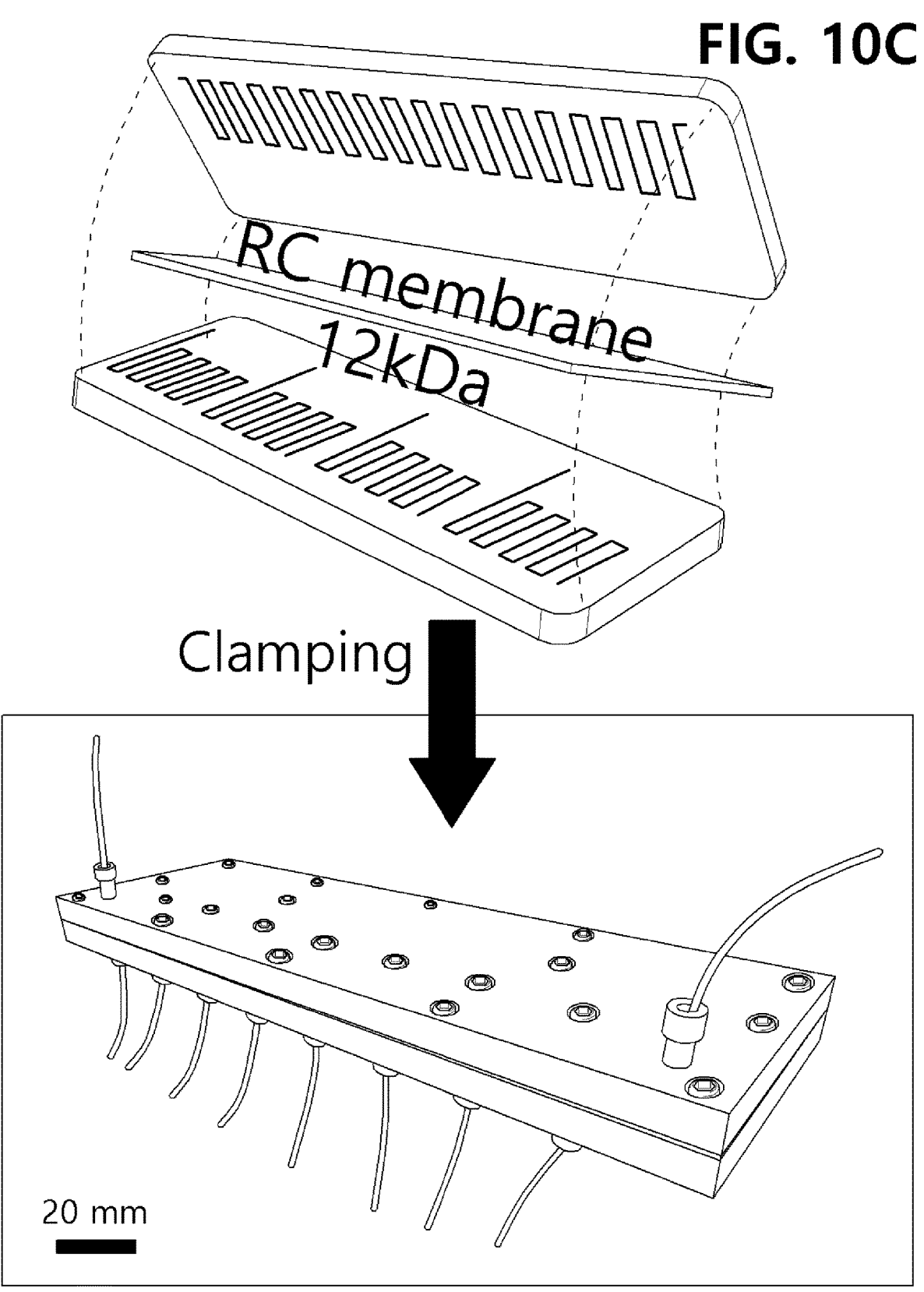
Figure 12A:
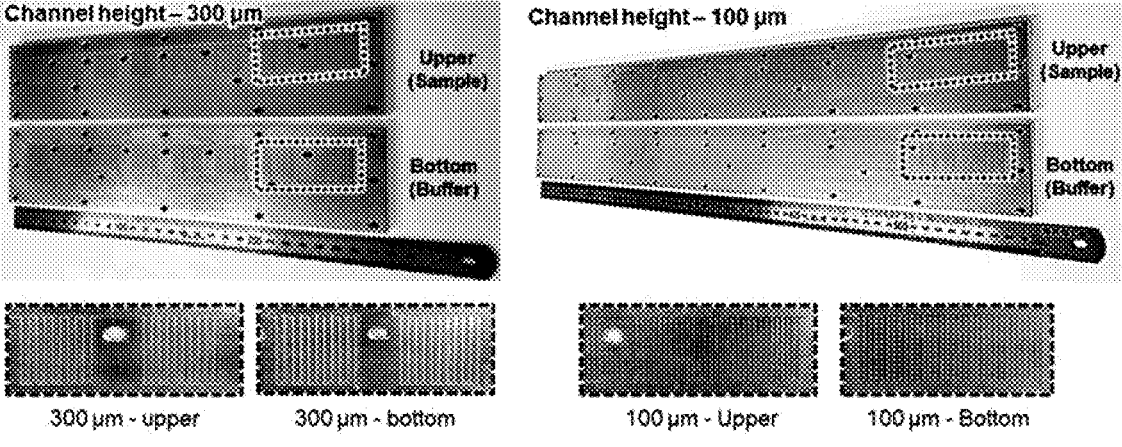
FIGS. 12A to 12C relate to real image of MBI and the experimental setup including on-line GC.
Figure 12B:
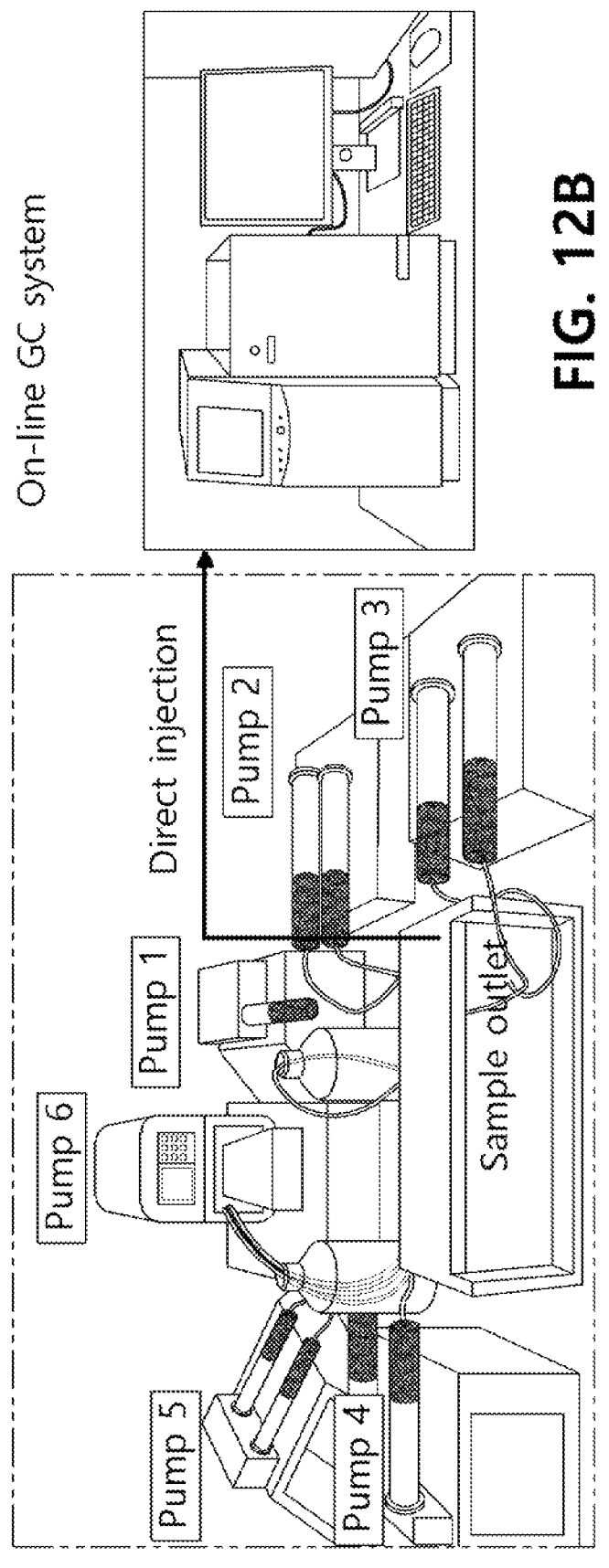
Figure 12C:
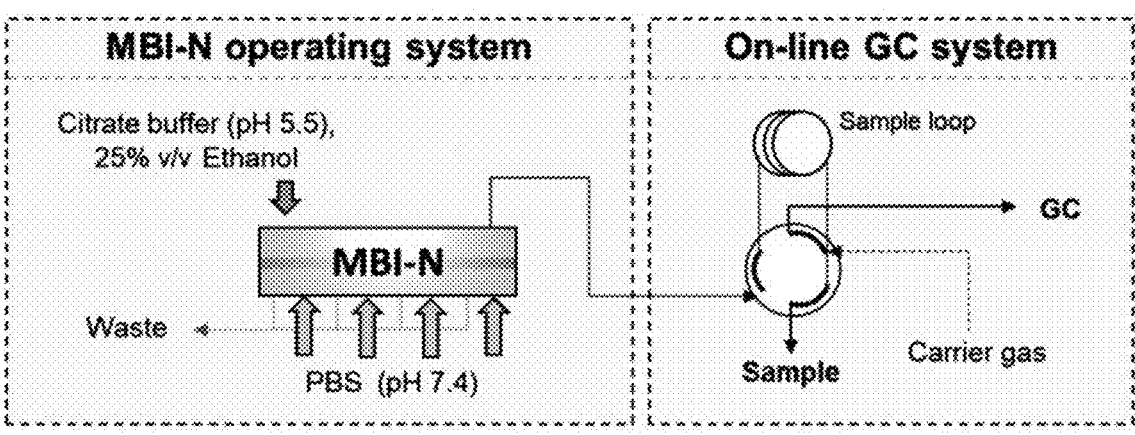
Figure 13A:
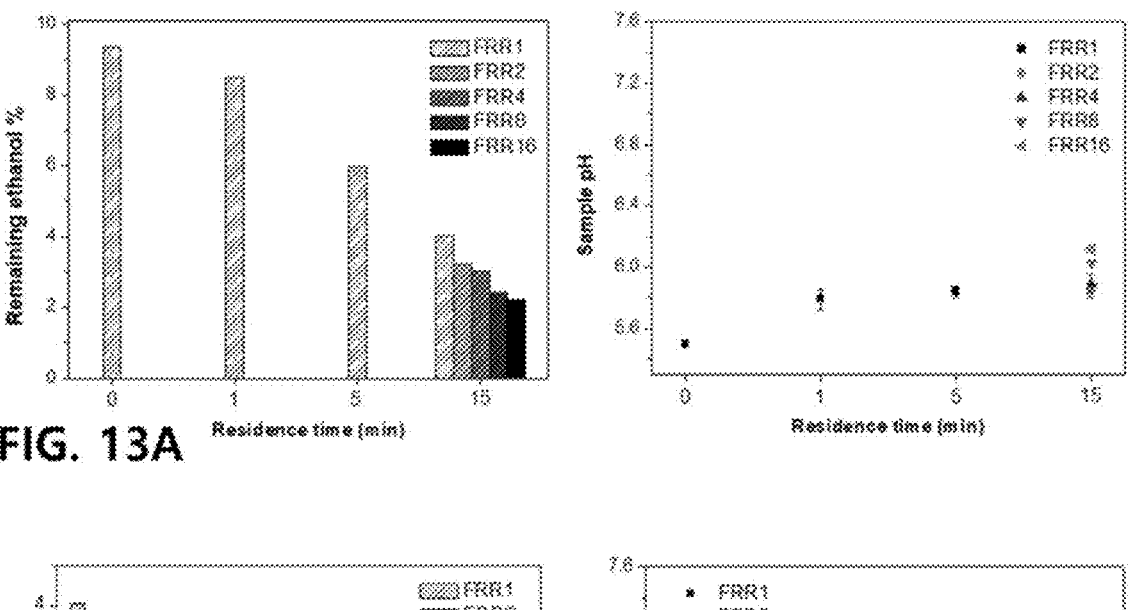
FIGS. 13A to 13C relate to the MBI optimization process, and show the extent of ethanol removal and pH adjustment based on residence time, flow rate ratio (FRR), buffer injection number (N), and channel height. Specifically.
Figure 13B:
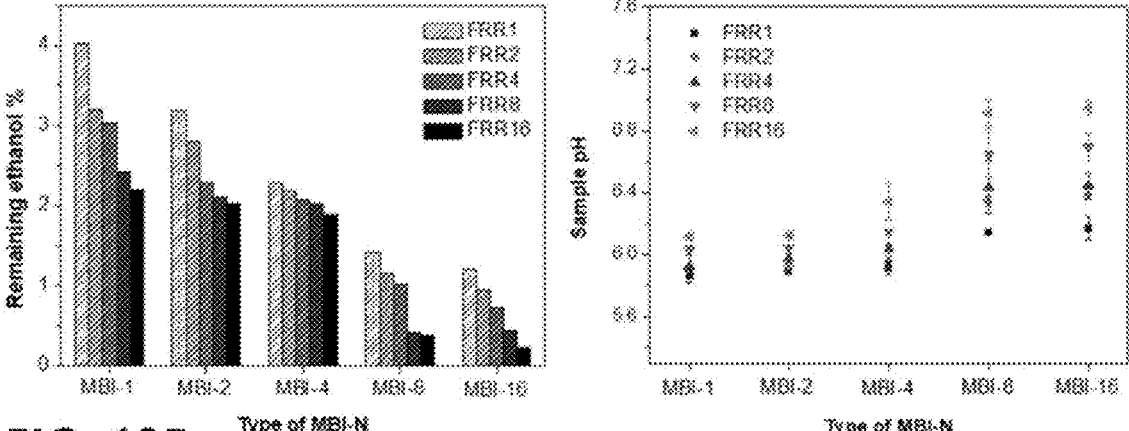

Based on the simulation results, MBI was manufactured by sandwiching a membrane layer between two stainless steel plates having patterned serpentine channels (width: 1 mm, height: 100 or 300 μm, and volume: 750 μL) (FIG. 10C and FIG. 12A). In addition, a regenerated cellulose membrane having a molecular weight cut-off (MWCO) of 12 kDa was used for stable maintenance of LBNP without effective size-based exclusion and loss. For the purification process experiment, citrate buffer (pH 5.5, 10 mM) containing 25% v/v ethanol was injected into the inlet of the upper channel, and phosphate buffer saline (PBS; pH 7.4, 10 mM) was injected into the various inlets of the lower channel under the counter-flow conditions. The flow rates of both the liposome sample ($Q_{sample}$) and the buffer ($Q_{buffer}$) were varied to investigate the effects of flow rate ratio (FRR, $Q_{Buffer}/Q_{Sample}$) and residence time on ethanol removal and pH control efficiency. The experimental setup of MBI-N is shown in FIG. 12B. In addition, the MBI-N outlet was directly connected to the online GC inlet for real-time analysis of ethanol present in samples (FIGS. 12B and 12C). When MBI-1 with a channel height of 300/was used at first, it was observed that the longer the residence time and the higher the FRR value, the better the mass transfer efficiency. However, even though the residence time was 15 minutes and the FRR was 16, the sample still included 2.2% ethanol, and the pH was maintained at 6.11, and was significantly deviated from the target pH 7.4 (FIG. 13A). In particular, when only the N value was increased from 1 to 16 under the same condition, the ethanol content was reduced to 0.23%, which is less than the standard (0.5%) presented in the International Council for Harmonisation (ICH) injectable drug guideline, and the pH was reached 6.9. In addition, when both N and FRR values reached 8, the ethanol removal efficiency approached the saturation state. When this condition was adopted, the buffer consumption was minimized and the required number of pumps was reduced (FIG. 13B). Thereafter, the channel height of MBI-8 was reduced to 100 μm to reduce the diffusion distance of the molecule to increase the mass transfer efficiency. As a result, the remaining ethanol content in the sample was reduced to 0.1%, and the desired target pH 7.4 was achieved.

Figure 10D:
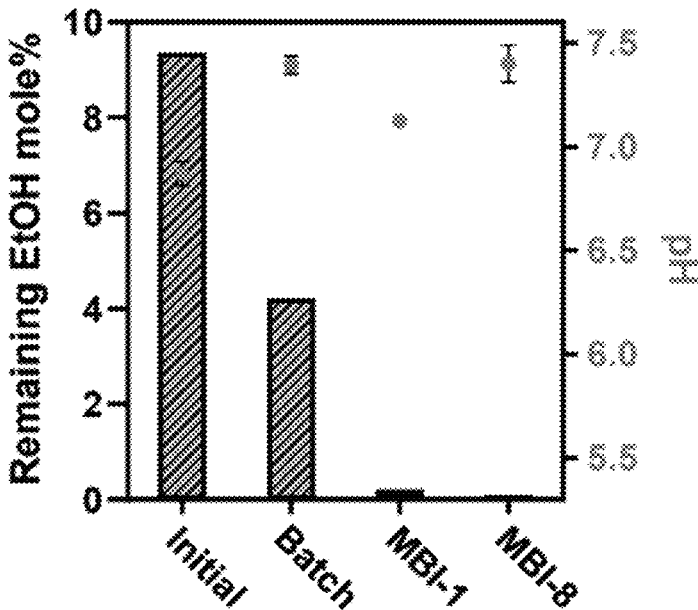
Figure 10E:
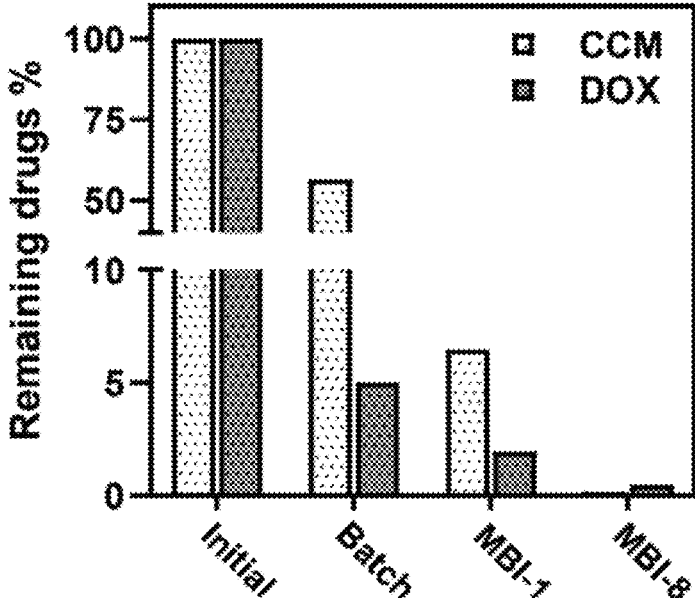
FIG. 10E compares removal performance of free DOX (0.3 mg mL$^{-1}$) and CCM (0.1 mg mL$^{-1}$) after applying batch dialysis, MBI-1, and MBI-8 at a dialysis time of 15 minutes. For MBI-1 and MBI-8, the direction of buffer injection is the opposite flow with an FRR value of 8.
Figure 13C:
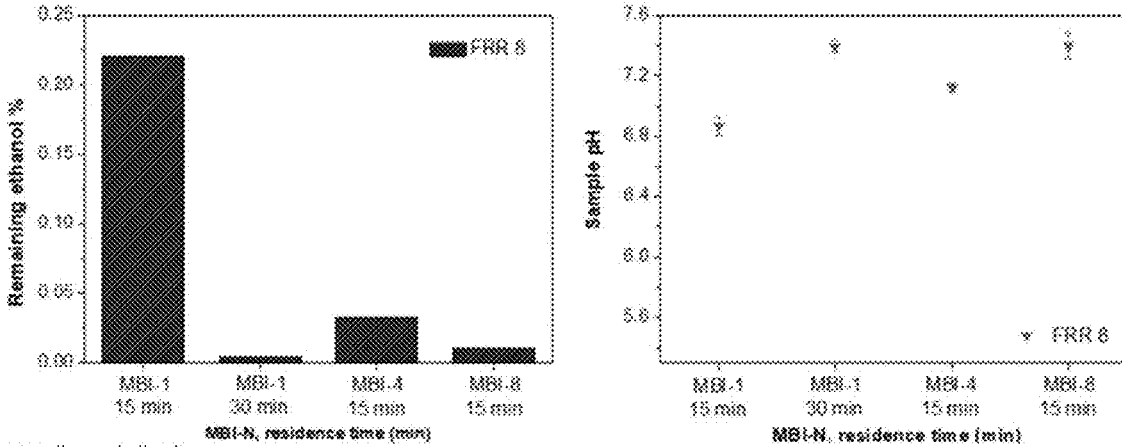
Figure 14A:
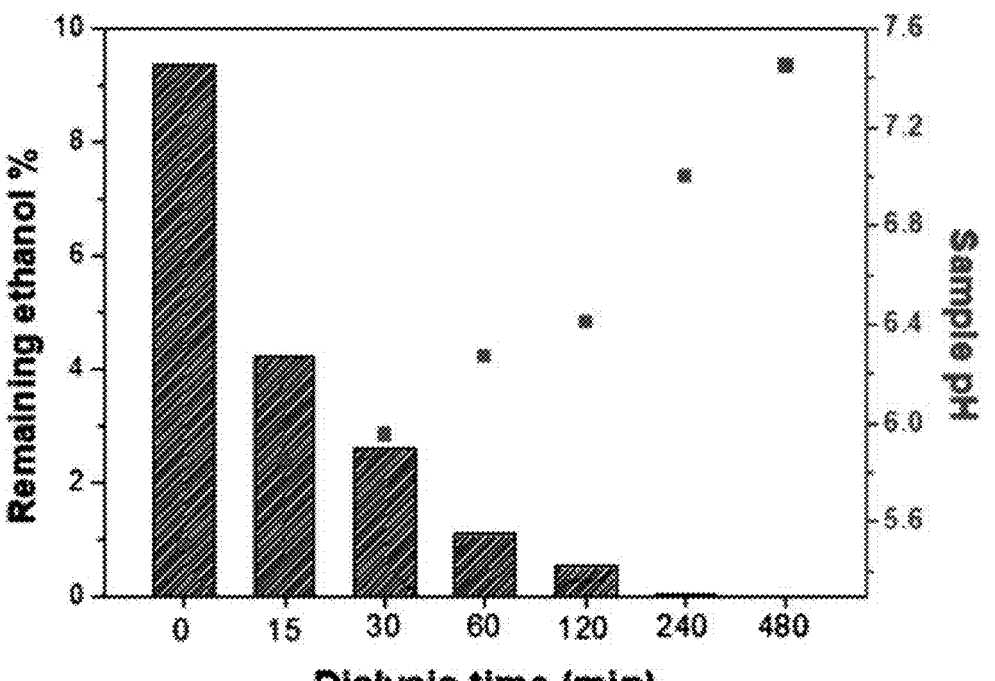
FIGS. 14A to 14D evaluate the purification performance and efficiency of the four different purification methods.
Figure 14B:
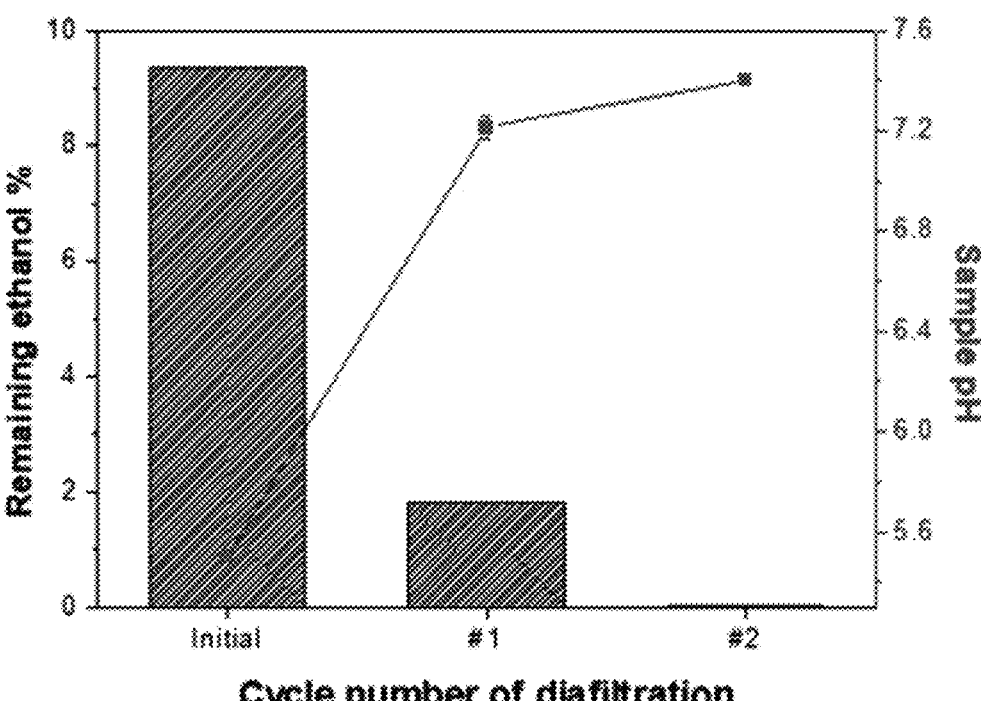

In contrast, batch dialysis and MBI-1 still showed a high remaining ethanol content (4.21% and 0.76% respectively) even after 15 minutes of dialysis time (FIGS. 10D, 13C and 14A). In the context of the optimized devices and process conditions, the purification performance of MBI-8 having a channel height of 100 μm was tested using a simple glass mixture of DOX (0.3 mg/mL) and CCM (0.1 mg/mL) that was not encapsulated in the liposome delivery. The successful removal of 99% was achieved for both drugs through MBI-8, indicating that all uncaptured free drugs may be efficiently and quickly removed regardless of EE. On the other hand, both batch dialysis and MBI-1 did not effectively remove DOX or CCM (FIG. 10E). The results indicate that MBI-8 having a channel height of 100 μm achieved a target pH 7.4 using the residence time of 15 minutes and FRR 8 while rapidly and efficiently removing ethanol and free drug from the liposome sample.

Example 2

Comparison of Purification Performance of Liposome Mixture

To compare the purification efficiency of the MBI-8 platform with other methods such as MBI-1, batch dialysis and diafiltration, dual-drug loaded liposomes (114 nm, PDI 0.07) dispersed in citrate buffer mixed with 25% v/v ethanol were used. The sample was prepared with a self-developed micromixer that provides high encapsulation of DOX (82%) and CCM (98%).

The self-developing 3D mixer was manufactured as follows. The 3D printed micromixer was designed with Autodesk Inventor software. To enable stable high-pressure fluid injection, each inlet was modeled with a 5 mm thread (¼-28 flat bottoms for ¹⁄₁₆ inches) and a 10 mm fluid stabilization area. Then, a micromixer was manufactured using a digital light processing (DLP)-based 3D printer (Pico 2 HD, Asiga) using a commercial resin (PlasCLEAR). To facilitate fluid injection, PTFE tubing with an inner diameter of 1.0 mm and XP-235 fitting were connected to the thread.

Liposomes loaded with DOX and CCM were generated using a modified passive method. To increase the encapsulation efficiency of DOX ($EE_{DOX}$) in the passive loading method, an anionic lipid (18 PA) was incorporated into the lipid composition to facilitate electrostatic interactions with DOX prior to self-assembly. A mixture of POPC/18 PA/Chol/DMG-PEG2000 was dissolved in ethanol at a total concentration of 10 mg/mL, with a molar ratio of 54.2–x/x/44.3/1.5. CCM was then dissolved in the lipid solution at a concentration of 0.1 mg mL–1. In the case of DOX solution, DOX was dissolved in 10 mM citrate buffer (pH 5.5) at a concentration of 0.3 mg mL$^{-1}$. The lipid-CCM solution and the DOX solution were injected independently into micro-mixer with syringe pumps. Dual-drug loaded liposomes were produced by varying the value of x from 0 to 15 and adjusting the flow rate ratio (FRR) from 3 to 9. Dynamic light scattering (DLS) measurements were utilized for measuring the size and PDI value of LBNPs. For the EE measurement, 3 mL of each sample was placed in a centrifugal filter device (Amicon® Ultra-15, Merck Millipore) and centrifuged at 3900 rpm for 40 minutes to remove free drugs and analyzed with UV-vis spectrophotometer. The results are shown in Table 1. As confirmed in Table 1, characterization of CCM and DOX loaded liposomes depends on molar ratio of 18 PA anionic lipid and flow rate ratio.

TABLE 1

| 18PA (mol %) | FRR | Size (d, nm) | PDI | $EE_{CCM}$ | $EE_{DOX}$ | Zeta Potential (mV) |
|---|---|---|---|---|---|---|
| 0 | 3 | 194 | 0.12 | 95 | 16 | 0.10 |
| | 6 | 66 | 0.09 | 100 | 4 | 0.33 |
| | 9 | 55 | 0.04 | 100 | 8 | 1.1 |
| 5 | 3 | 131 | 0.09 | 97 | 52 | −0.65 |
| | 6 | 68 | 0.10 | 100 | 38 | −0.42 |
| | 9 | 68 | 0.12 | 100 | 29 | −0.24 |
| 10 | 3 | 114 | 0.07 | 98 | 82 | −3.4 |
| | 6 | 53 | 0.12 | 99 | 53 | −1.1 |
| | 9 | 49 | 0.09 | 100 | 38 | −0.87 |
| 15 | 3 | 137 | 0.15 | 95 | 85 | −5.5 |
| | 6 | 74 | 0.11 | 96 | 65 | −4.3 |
| | 9 | 70 | 0.11 | 100 | 31 | −4.5 |

To produce cationic liposomes, cationic lipid DOTAP was used as the primary lipid component. DOTAP/Chol/DMG-PEG2000 were dissolved in ethanol at a total concentration of 5 mM with a molar ratio of 49.25/49.25/1.5. As antisolvent, a 3 M sodium acetate solution was diluted with nuclease-free water (NFW) to a concentration of 25 mM. The pH of the sodium acetate buffer was adjusted to 5.5 using a 100 mM acetic acid solution. Prior to injection, both the lipid solution and sodium acetate buffer were passed through a 0.22 μm syringe filter. The lipid solution and sodium acetate buffer solution were injected into the micromixer at flow rates of 2.4 mL min-1 and 7.2 mL min-1, respectively. The generated liposomes were purified through batch, DF, MBI-1, and MBI-8.

High-concentration empty-LNPs were prepared as follows. SM-102/DSPC/Chol/DMG-PEG2000 at molar ratio of 50/10/38.5/1.5 with a total concentration 32 mM were dissolved in ethanol. The preparation of a 25 mM sodium acetate buffer and filtration of each solution were carried out using the same method as mentioned above. The lipid solution and buffer were each injected into the micromixer at flow rates of 3 mL min$^{-1}$ and 9 mL min$^{-1}$, respectively. Following the formulation, empty-LNPs were purified using the same methods above.

Figure 14C:
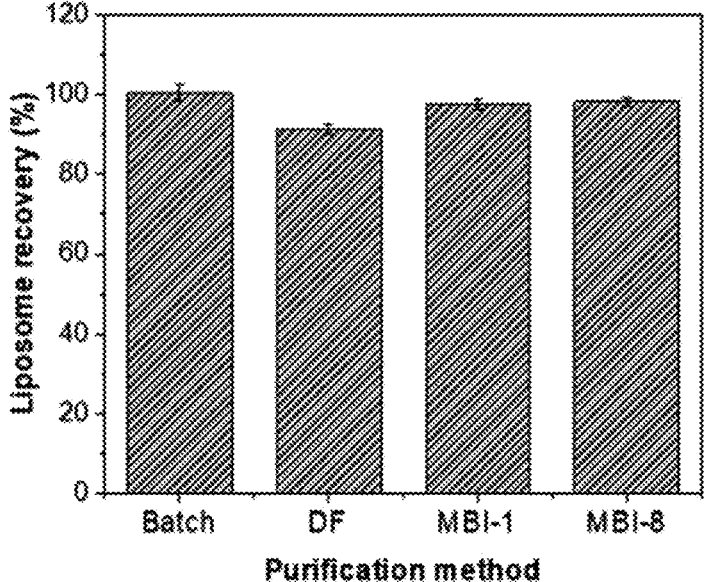
Figure 14D:
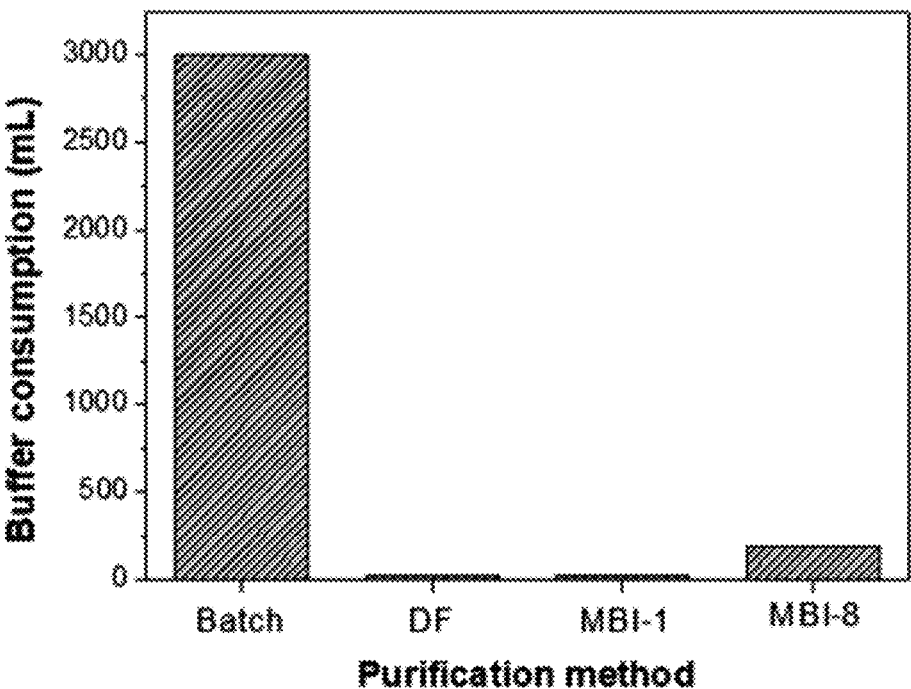

As a result of the comparison of the purification performance, MBI-8 achieved ethanol residual of less than 0.5%, pH 7.4, and high recovery rate of 98% in 15 minutes, whereas MBI-1, batch dialysis, and diafiltration require longer times of 30 minutes, 8 hours, and 80 minutes, respectively (FIGS. 15A, 13C, 14A, and 14B). In addition, the diafiltration showed slightly low liposome recovery rates (92%) due to repeated centrifugal force-induced adhesion and/or penetration loss (FIG. 14C). In addition, only 192 mL of PBS buffer was needed for MBI-8 to purify the 3 mL liposome sample, but 3000 mL of buffer was needed for the batch dialysis to purify the above sample. This means that MBI-8 consumed 15.6 times less buffer, which has an economic advantage (FIG. 14D).

Figure 15A:
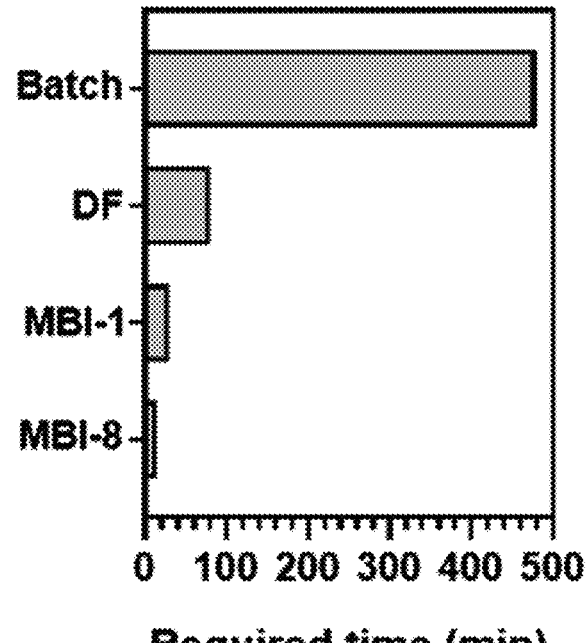
FIGS. 15A to 15G illustrate comparative purification performance of four different methods for the dual-drug loaded liposomes.
Figure 15B:
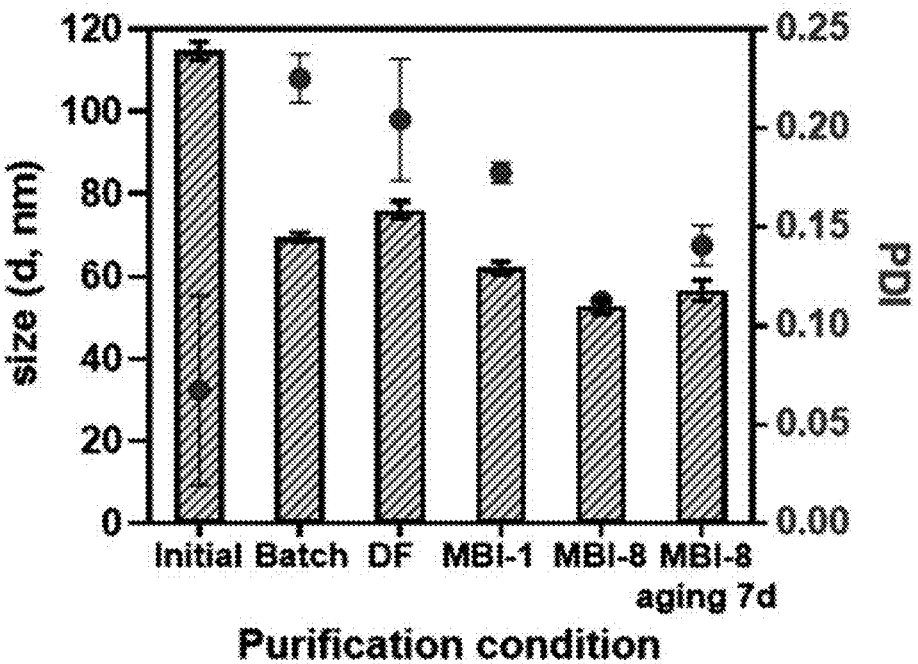
Figure 15C:
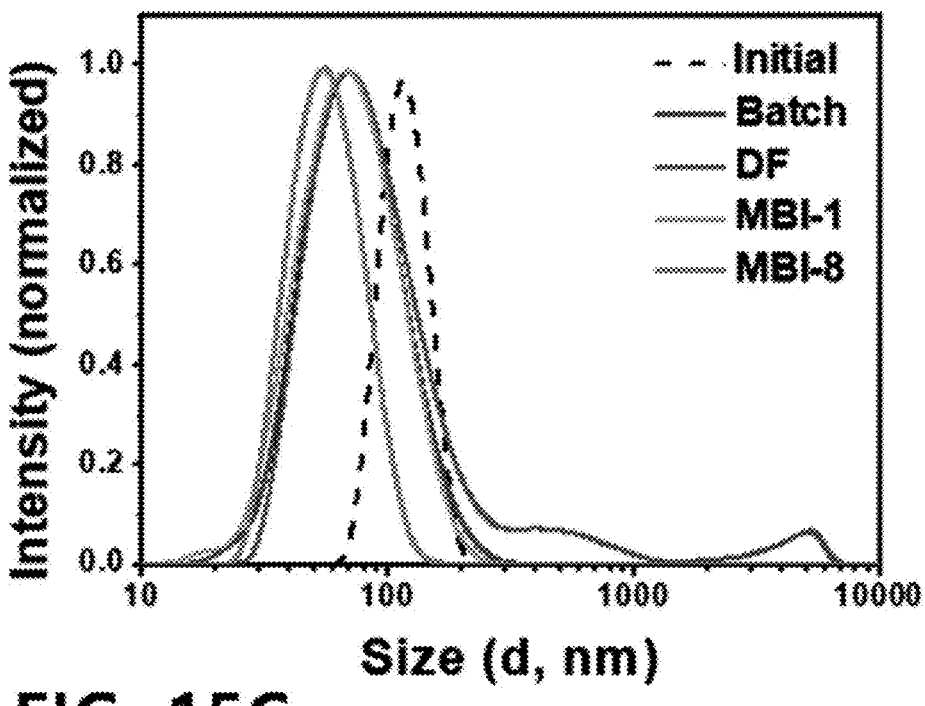
Figure 15D:
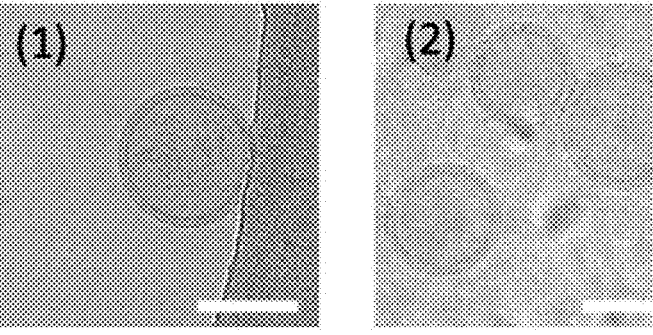
Figure 15E:
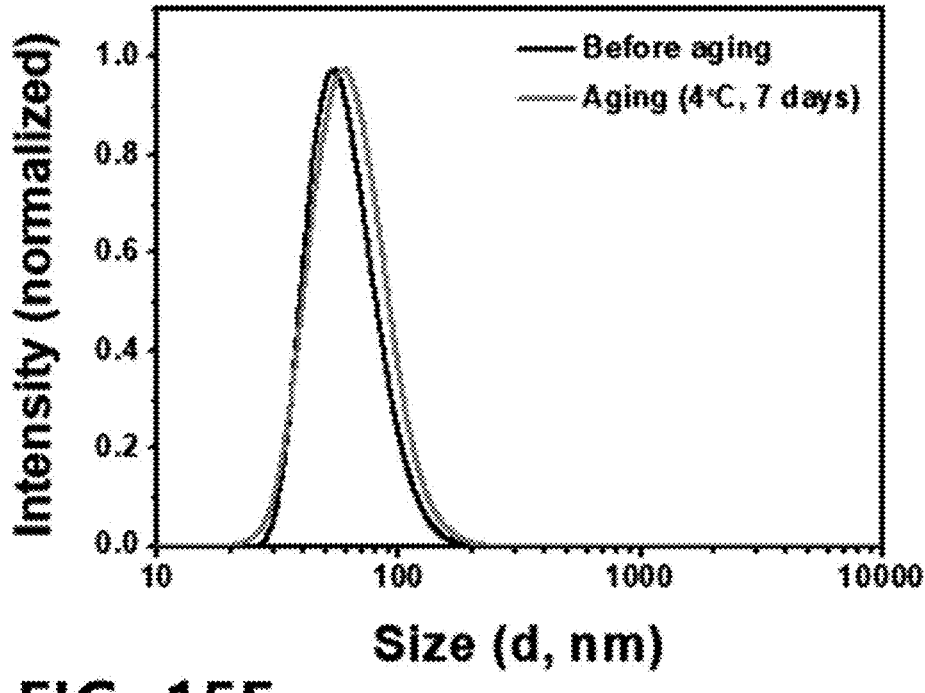
Figure 15F:
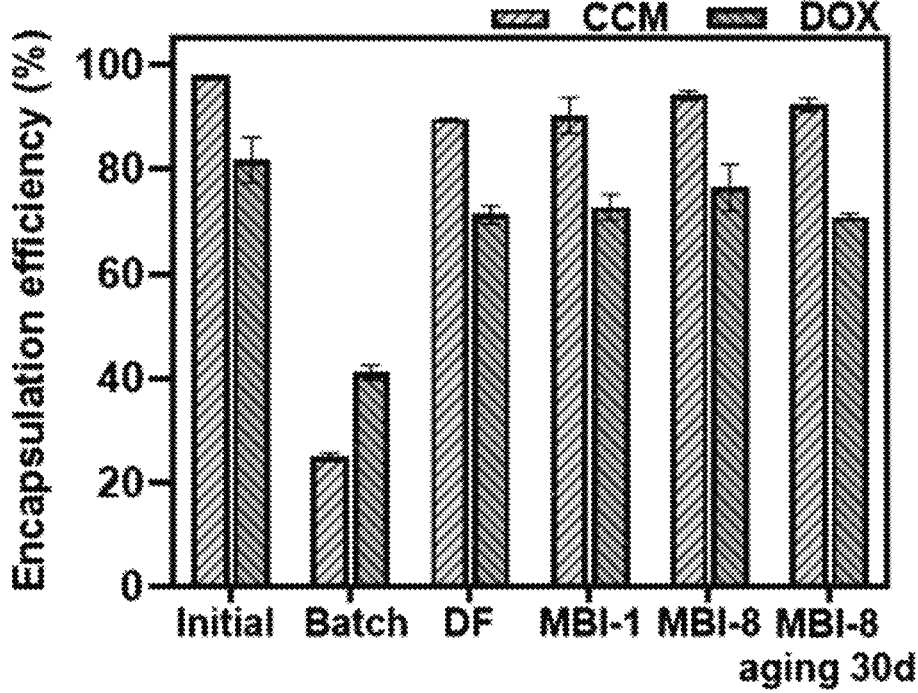
Figures 16, 17:
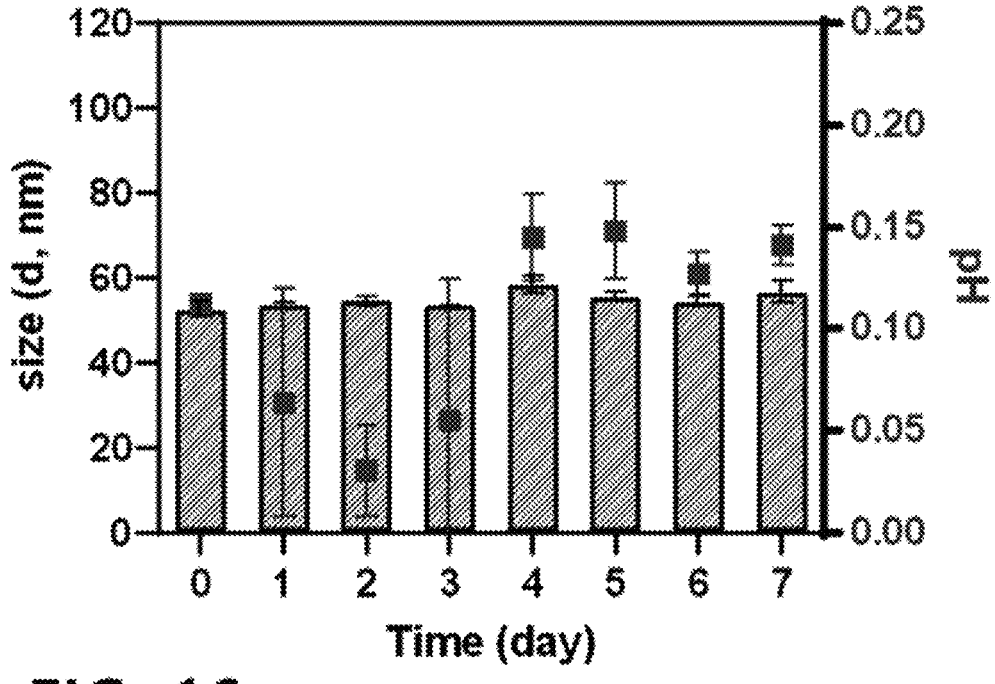
FIG. 16 illustrates changes in physical properties of liposomes purified using MBI-8, and illustrates the size and PDI values of liposomes during storage at 4° C. for 7 days after purification with MBI-8.
FIG. 17 validates MBI-8's capability to remove untrapped drugs, and section (a) of FIG. 17 illustrates the schematic diagram of the additional filtration process of LBNP samples before and after purified through MBI-8. After centrifugation at 3900 RPM, filtrated solutions were analyzed using UV-Vis. Section (b) of FIG. 17 illustrates UV-Vis peaks of filtrated solutions. The filtrated solution of LBNPs, purified through MBI-8, illustrates the absence of peaks at wavelength of 420 nm and 480 nm corresponding to CCM and DOX, respectively. This result indicates the effective removal of all un-trapped drugs through MBI-8 purification.

Thereafter, the effect of each purification method on particle size, PDI, and EE was evaluated. In all the purification methods, particle size decrease was observed due to decrease in ethanol concentration, and lipid reconstruction was triggered to improve the compactness of the lipid bilayer. In particular, MBI-8 achieved a significant size reduction to 52 nm with a low PDI of 0.11 due to rapid ethanol removal (FIGS. 15B and 15C) and maintained its lipid bilayer structure (FIG. 15D). In particular, when liposomes purified through MBI-8 were further aged at 4° C. for 7 days, the structural and physical (size: 56.7 nm and PDI: 0.14) properties of liposome were well maintained (FIGS. 15D, 15E and 16). The encapsulation efficiencies of CCM ($EE_{CCM}$) and DOX ($EE_{DOX}$) after MBI-8 purification were 94% and 76%, slightly decreased by 4% and 6% compared to the initial values. Surprisingly, even after the MBI-8 purified liposome sample was stored at −78° C. for 30 days after freeze drying, $EE_{CCM}$ and $EE_{DOX}$ decreased by only 1.8% and 5.9%, respectively (FIG. 15F). In addition, after additionally filtering the sample purified through MBI-8, it was confirmed that there was no peak corresponding to DOX and CCM in the filtered solution through UV-Vis analysis, providing conclusive evidence that the free drug was removed (FIG. 17).

Both MBI-1 and diafiltration cases showed an $EE_{CCM}$ of 90%, and $EE_{DOX}$ values were 73% and 71%, respectively, indicating higher-than-expected drug encapsulation (FIG. 15F). However, MBI-1 had a particle size of 62 nm and a PDI value of 0.17, which was inferior to MBI-8 (52 nm, PDI 0.11). In particular, in the case of diafiltration, the particle size increased to 70 nm and the PDI value increased to 0.2 through an extended size distribution, which was probably caused by liposome aggregation by centrifugal forces (FIGS. 15B and 15C). When exposed to ethanol for a long time in batch dialysis, the particle size increased to 70 nm, the PDI value increased to 0.23 with a secondary peak in the micrometer range, and the $EE_{CCM}$ and $EE_{DOX}$ significantly decreased to 23% and 41%, respectively, due to ethanol-induced membrane destabilization and drug leakage (FIGS. 15B, 15C, 15F, and 18).

Then, the aforementioned results are normalized and plotted on a radar graph to comprehensively evaluate performance efficiency. In five aspects of the production performance index ($Q=size^{-1}PDI^{-1}$, product of the reciprocal of diameter (d, nm) and PDI value of LBNP), buffer saving (BS), drug preservation capability (DPC), time saving (TS), and liposome recovery (R), MBI-8 illustrates excellent efficiency with values close to 1 (Table 2).

TABLE 2

| | Normalized value | | | | | Purification |
| | Q | R | DPC | BS | TS | Area | efficiency |
|---|---|---|---|---|---|---|---|
| MBI-8 | 1.00 | 0.95 | 1.00 | 0.93 | 0.97 | 2.23 | 100 |
| MBI-1 | 0.54 | 0.92 | 0.96 | 0.99 | 0.94 | 1.84 | 82.7 |
| Batch | 0.38 | 1.00 | 0.40 | 0.00 | 0.00 | 0.37 | 16.7 |
| DF | 0.38 | 0.90 | 0.95 | 0.99 | 0.83 | 1.62 | 72.6 |

Figure 15G:
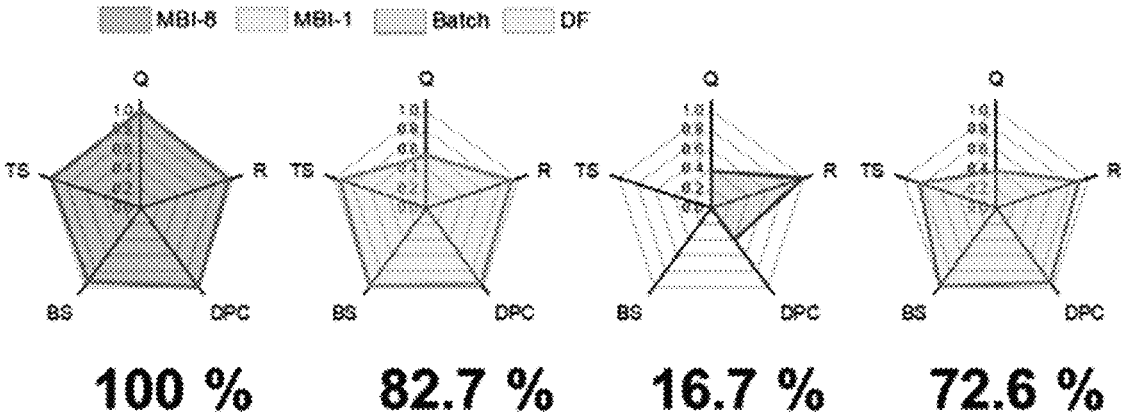

In particular, MBI-8 outperformed other purification methods for the Q value, which reflects the challenge and importance of maintaining liposomes small and uniform in size for drug delivery system. In order to quantify the purification efficiency based on the radar graph area, the area of MBI-8 (2.23) was assumed to be 100% efficiency, and the efficiency was measured by comparing the area ratios of other purification methods. In particular, higher efficiency was demonstrated in the order of MBI-8. MBI-1, diafiltration, and batch dialysis. In addition, the microfluidic-based modules (MBI-1 and MBI-8) had more excellent efficiency than diafiltration and batch dialysis generally used for LBNP purification (FIG. 15G and Table 2). In conclusion, MBI-8 not only completed the purification process in just 15 minutes, but also maintained the important characteristics of the drug delivery system, showing superior purification efficiency compared to other methods.

Example 3

Comparison of In Vitro Tests of Dual-Drug Loaded Liposomes

Figures 18, 19A:
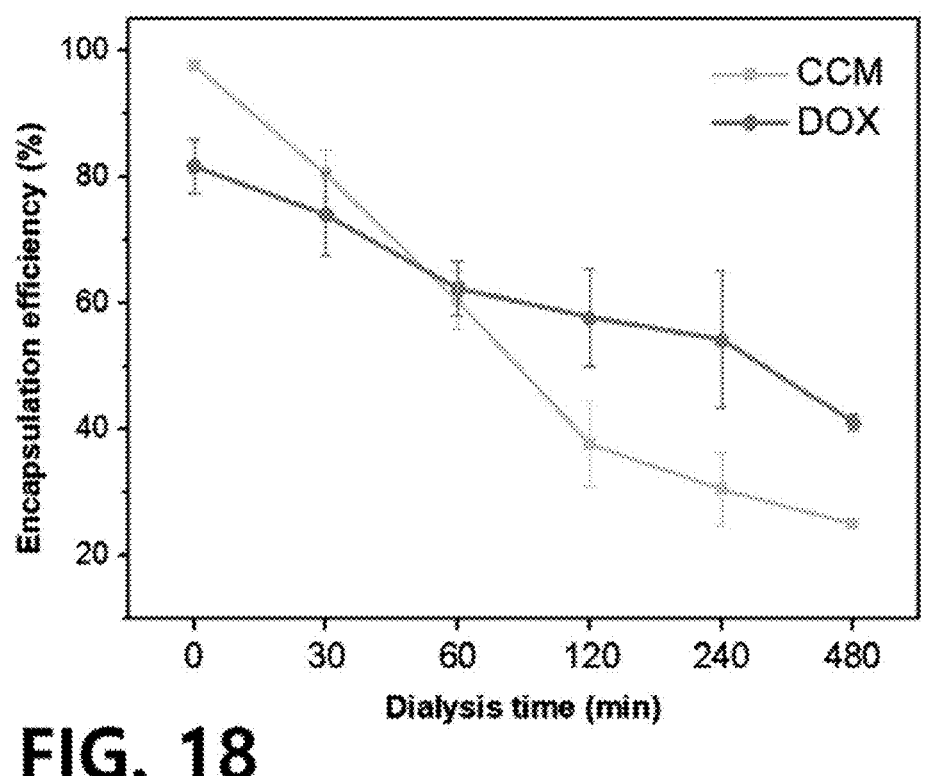
FIG. 18 illustrates the encapsulation efficiency of DOX and CCM during batch dialysis.
FIGS. 19A to 19D relate to the results of in vitro comparative tests for culturing Hela cells with dual-drug-loading liposomes purified by four different methods, wherein the purified sample was diluted with PBS buffer to the same DOX concentration of 10 μg/mL before being introduced into HeLa cells.
Figure 19B:
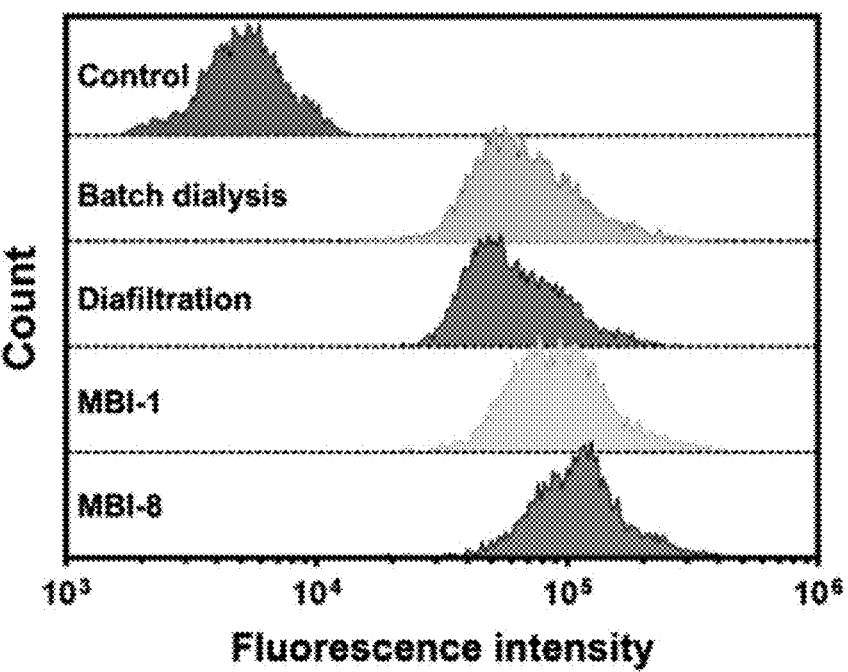
Figure 19C:
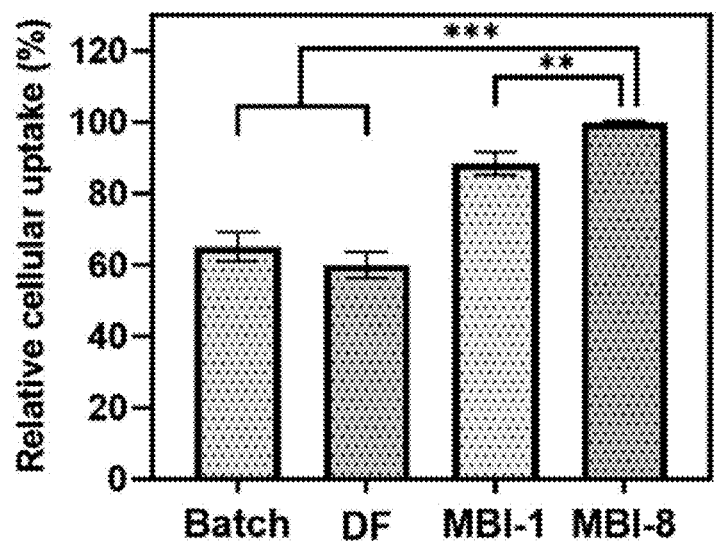

To evaluate the antitumor effect of dual-drug loaded liposomes purified by four separate methods resulting in various liposome sizes and uniformity, in vitro tests using HeLa cells were performed. To exclusively investigate the effect of particle size and PDI values on cell uptake and cytotoxicity, each of the four purified samples was diluted to the same 10 μg/mL DOX concentration using PBS before introduction into HeLa cells to remove the DOX positive element, which is an important factor in antitumor therapeutic efficacy. In a cell uptake study using a confocal laser scanning microscope (CLMS) four hours after HeLa cells were treated with a liposome sample, stronger fluorescence of internalized DOX was observed in MBI-1 and MBI-8 samples compared to batch dialysis and diafiltration (FIG. 19A). In particular, fluorescence-activated single cell sorting (FACS) analysis showed that MBI-8 purified liposomes showed 1.53 times higher cell uptake than batch dialysis, 1.67 times higher than diafiltration, and 1.13 times higher than MBI-1 (FIGS. 19B and 19C).

Figure 19D:
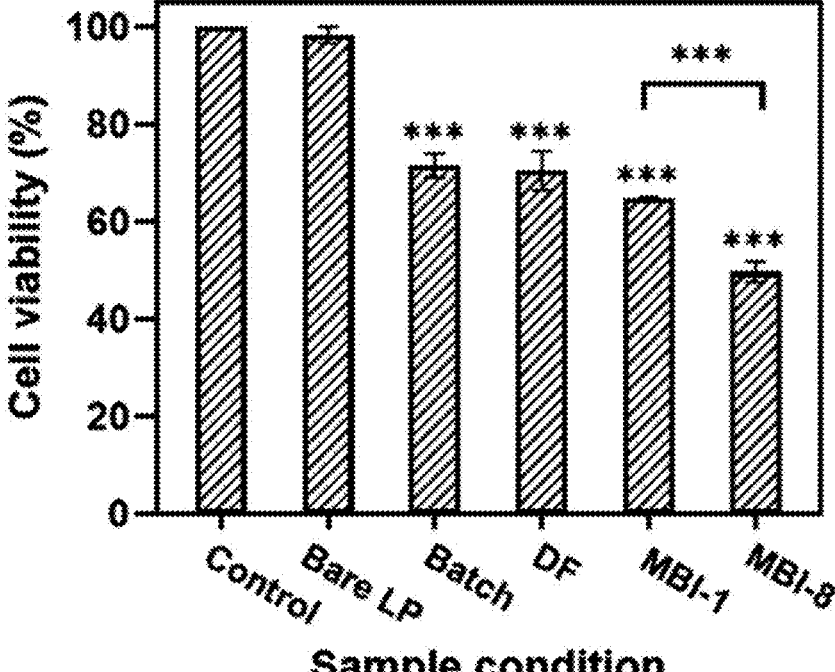
Figure 20:
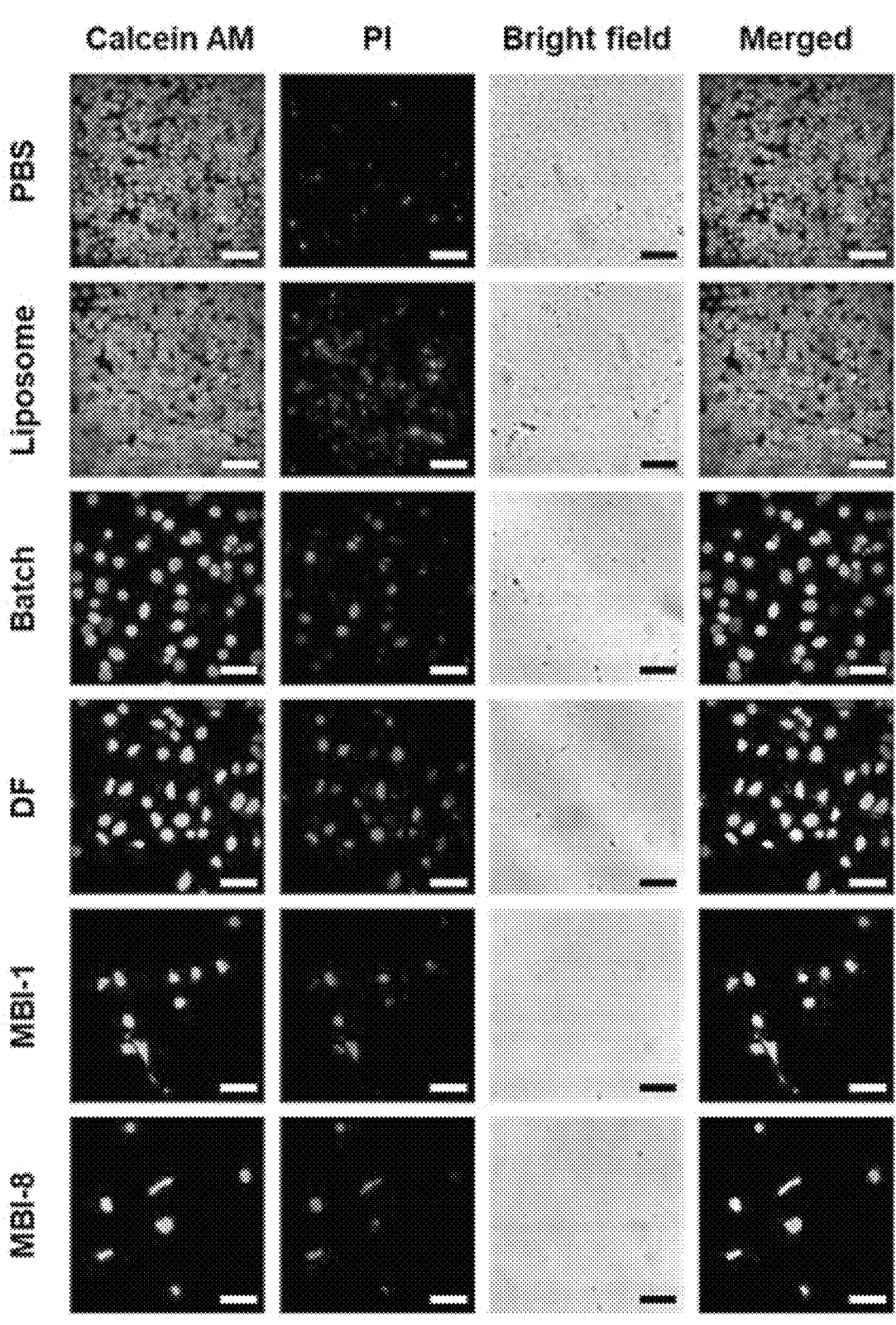
FIG. 20 illustrates the results of comparative cytotoxicity of liposomes purified through four different methods, and illustrates CLSM image of HeLa after 24 hours treatment with PBS buffer, bare liposomes, and liposome samples purified with four different methods. Purified samples were diluted with PBS buffer to an equal DOX concentration of 10 μg/mL before introduction to HeLa cells. Calcein AM (Green fluorescence) was used to detect live cells and propidium iodide (Red fluorescence) was utilized to detect dead cells (scale bar=100 μm).

In addition, MBI-8 liposome showed the lowest cell viability (49.6%) with more potent cytotoxicity after 24 hours of treatment with liposomes to evaluate cytotoxicity against Hela cells, demonstrating a remarkably superior antitumor effect. In contrast, batch dialysis, diafiltration, and MBI-1 showed higher cell viability of 71.6%, 70.5%, and 64.7%, respectively, with higher presence of adherent living cells (FIGS. 19D and 20). These in vitro cell tests confirmed that MBI-8 liposomes with smaller size (52 nm) and higher uniformity (PDI, 0.1) were more effective in enhancing cell interactions compared to batch dialysis and diafiltration liposomes with lower antitumor activity and reduced cell uptake due to increased particles over several hundred nanometers (FIG. 15C). Thus, in vitro studies indicate that liposomes purified using MBI-8 dialysis showed higher cellular updates of liposome encapsulation drugs, thereby enhancing cytotoxicity, which means an increase in antitumor effects compared to other methods.

Example 4

Various Applicability of the mbi-8 Platform

Figure 21A:
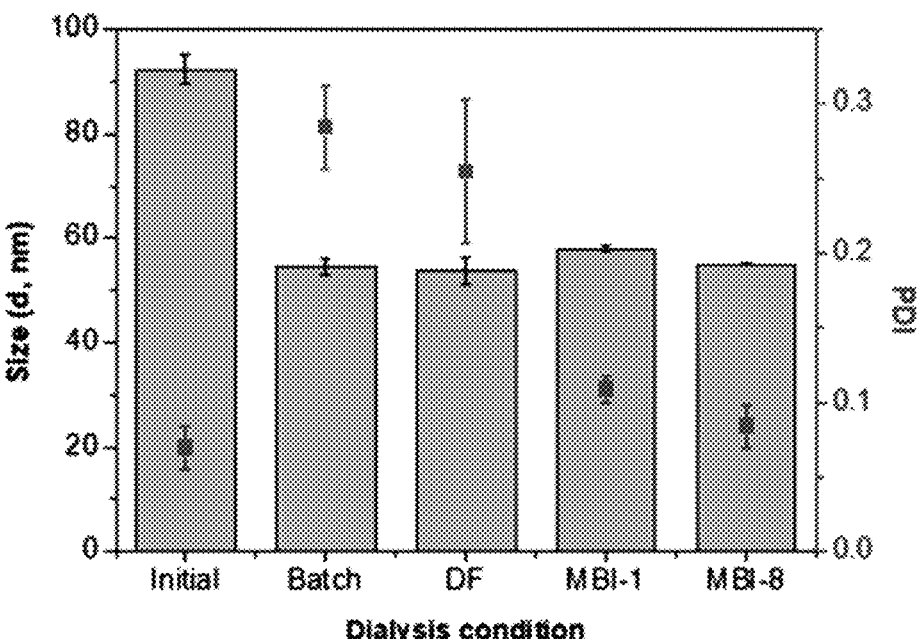
FIGS. 21A to 21D analyze characterization of physical properties of LBNPs purified through four different methods.
Figure 21B:
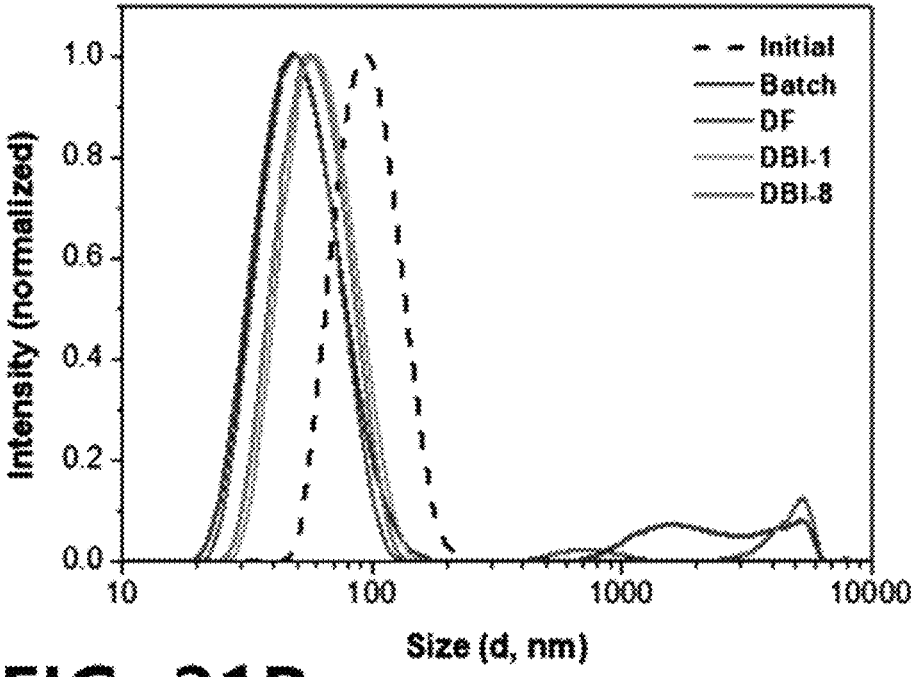
Figure 21C:
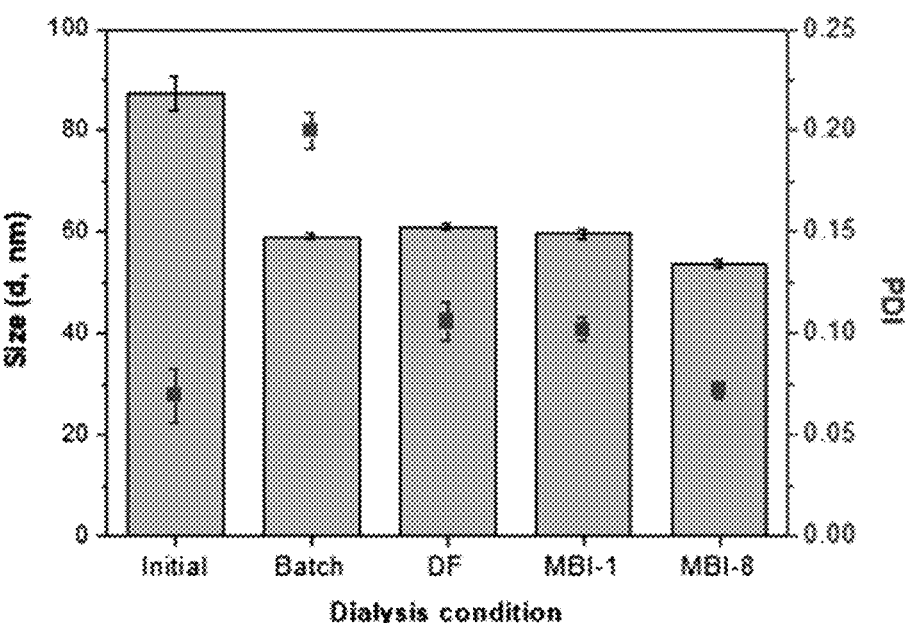
Figure 21D:
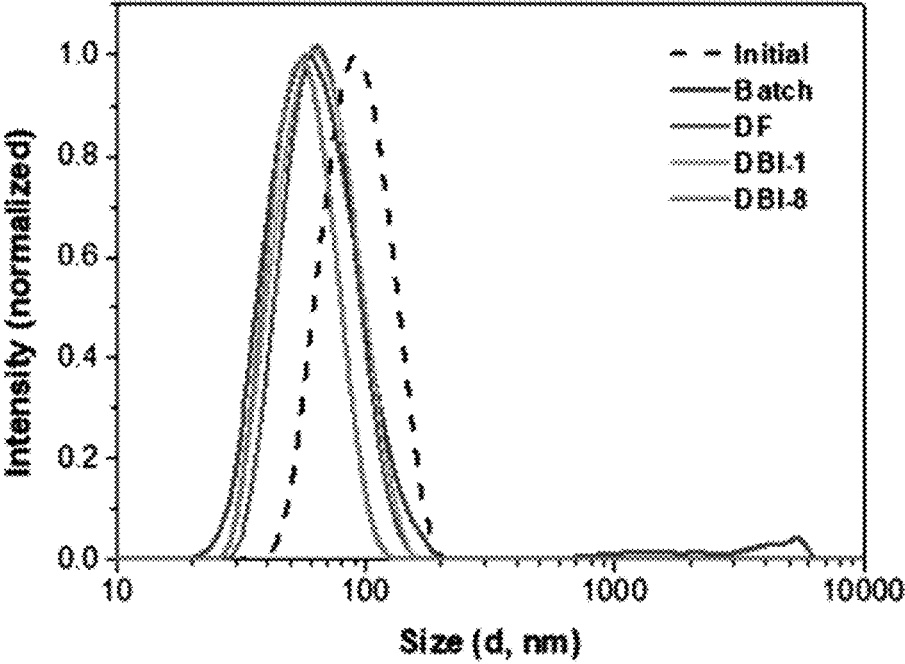
Figures 22A, 22B:
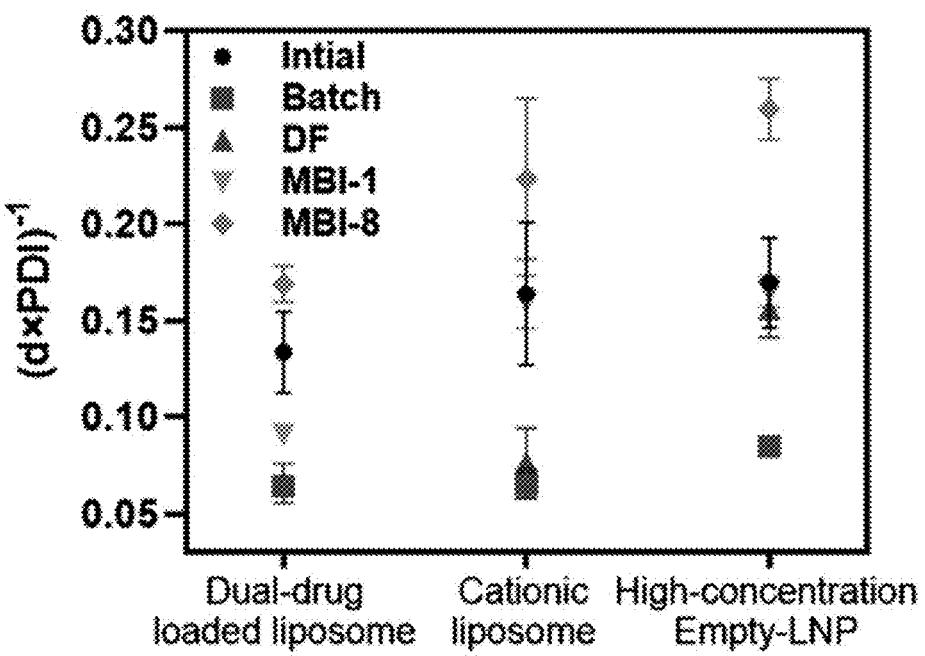
FIGS. 22A and 22B illustrate MBI-8 performance in various applications, FIG. 22A compares the Q values after applying four purification methods to three different LBNPs.

MBI-8 was applied to various LBNPs and biotherapeutics to demonstrate its useful versatility. When DOTAP (dioleoyl-3-trimethylamino propane)-based cationic liposomes were purified through the MBI-8 process, they showed particle sizes similar to those obtained by other purification methods, but showed excellent particle uniformity with a PDI value of 0.08 (FIGS. 21A and 21B). Additionally, in the case of SM-102-based empty LNPs, the particle size was maintained at 53 nm and the PDI value was 0.07 even though it was purified to a higher concentration (32 mM) than the reported concentration (8-10 mM). (Macki, M. et al. Mass production system for RNA-loaded lipid nanoparticles using piling up microfluidic devices. Appl. Mater. Today 31, 101754 (2023); Cheng, M. H. Y. et al. Induction of Bleb Structures in Lipid Nanoparticle Formulations of mRNA Leads to Improved Transfection Potency. Adv Mater., 2303370 (2023)). This highlights both the ability of the MBI-8 process to purify high concentration LBNPs and the importance of rapid ethanol removal (FIGS. 21C and 21D). As mentioned above, the Q value is an important parameter for evaluating the physical properties of the particle. In particular, in-line with the dual-drug loaded liposomes, both the cationic liposomes and the high concentration SM-102-LNPs showed significantly higher Q values (0.22 and 0.26, respectively) in MBI-8 compared to the other three purification methods including the initial value (FIG. 22A).

Figure 23A:
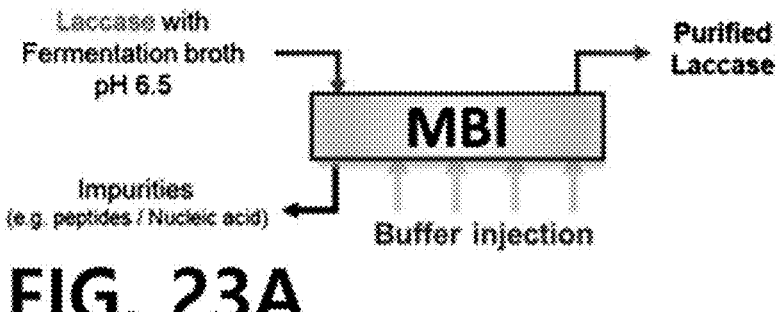
FIGS. 23A and 23B show purification of laccase through MBI-8.
Figure 23B:
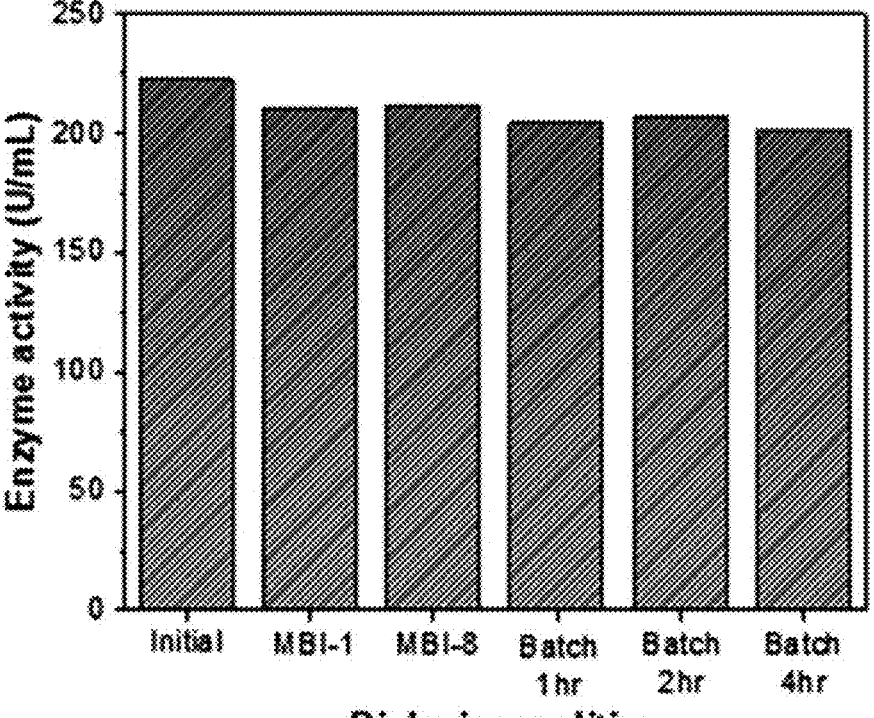

Dialysis is one of the standard approaches used for the downstream processing of proteins and enzymes. The applicability of MBI-8 dialysis for removal of minor impurities and buffer exchange in samples consisting of laccase enzyme present in fermentation broth samples was also investigated. The laccase showed oxidoreductase properties with a wide range of industrial and therapeutic applications, including antitumor properties. The MBI-8 process rapidly dialyzed the laccase-containing fermentation broth and efficiently removed small impurities such as peptides, nucleic acids, and other cellular components (FIG. 23A). Interestingly, all impurities were removed within just 15 minutes, so the protein concentration rapidly decreased from 0.19 mg/mL to 0.1 mg/mL, and reached the target pH of 7.4. On the other hand, in the case of MBI-1, the purification process was not completed within the same residence time, and in particular, in the case of batch dialysis, a much longer time (4 hours) was required to achieve the same level of purification performance (FIG. 22B). Additionally, considering the enzyme activity before and after purification through MBI-8, a high enzyme recovery rate of 95% was shown at 222.1 U/mL and 211.5 U/mL, respectively (FIG. 23B). Therefore, it can be concluded that the mbi-8 successfully removed unwanted impurities that showed a reduction in protein concentration at a short time while maintaining the laccase enzyme activity (removed unwanted small peptides and protein).

Example 5

Confirmation of Long-Term Operability of the MBI-8 Platform

Figure 24A:
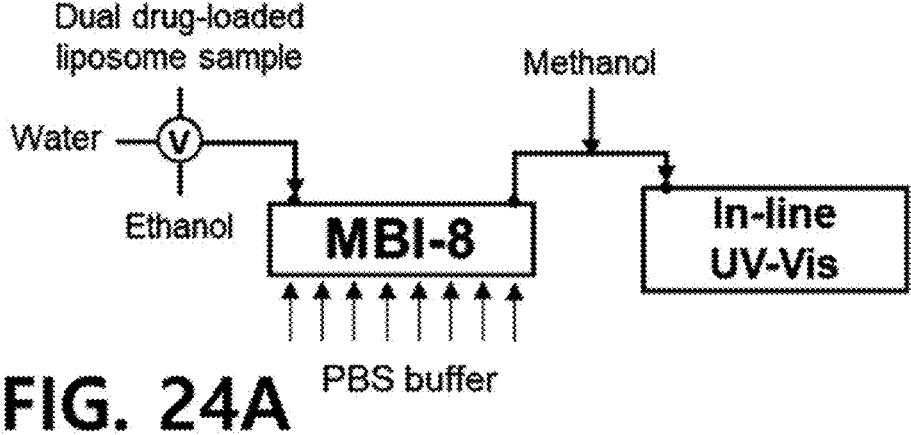
FIGS. 24A to 24E show results of a long-term use of MBI-8.
Figure 24B:
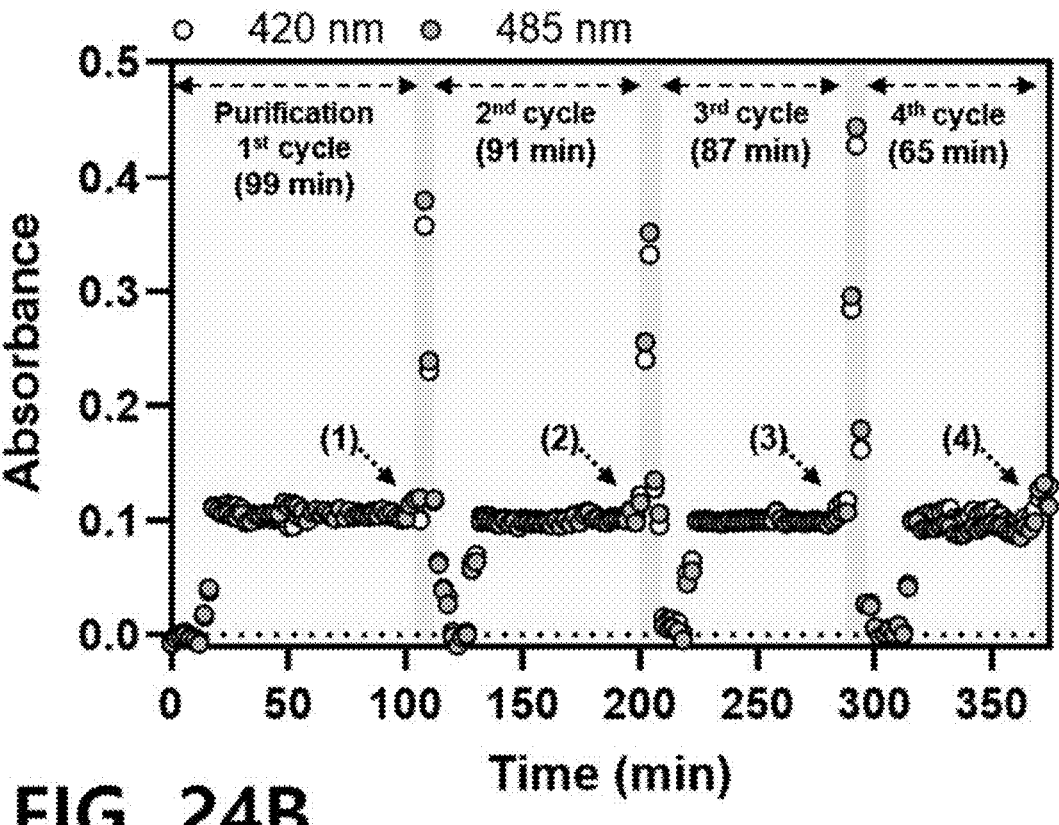
Figure 24C:
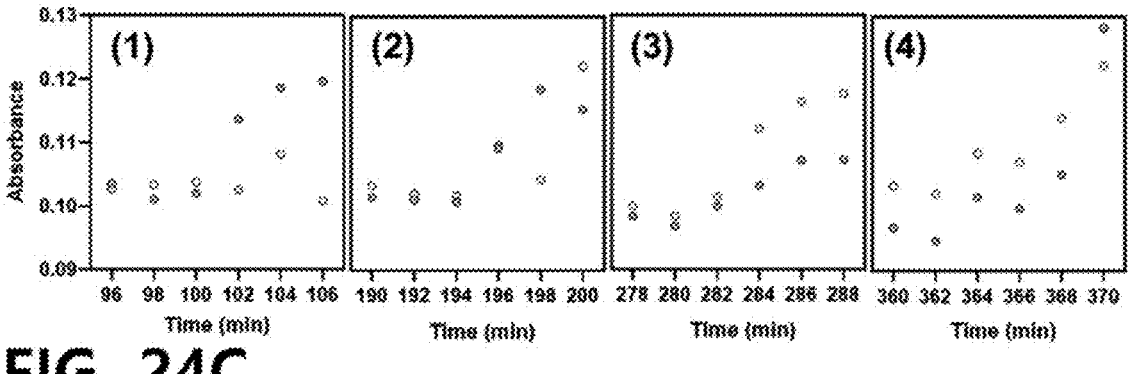
Figure 24D:
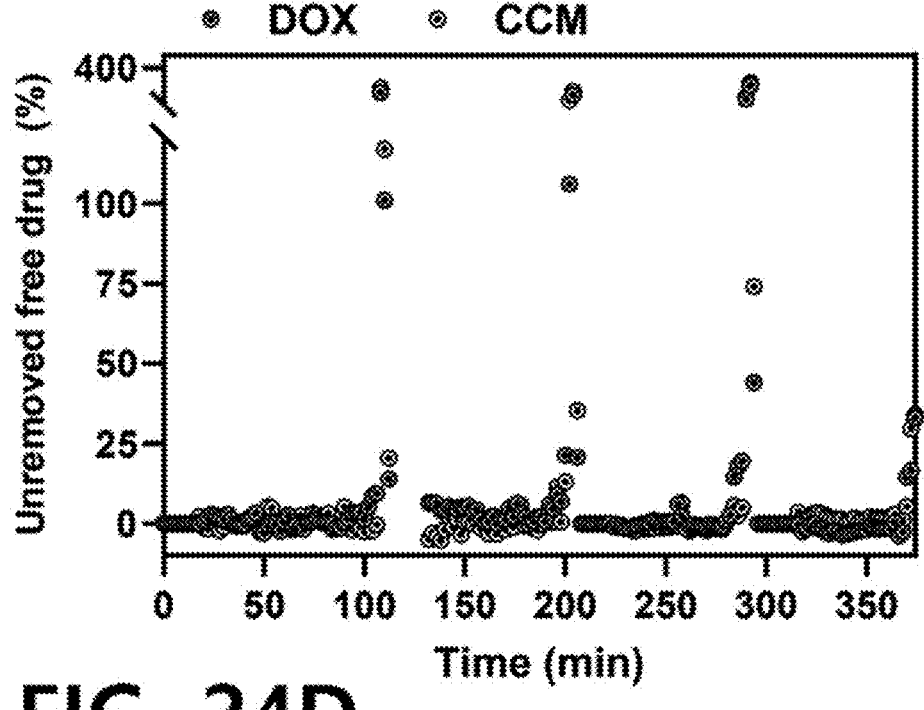
Figure 24E:
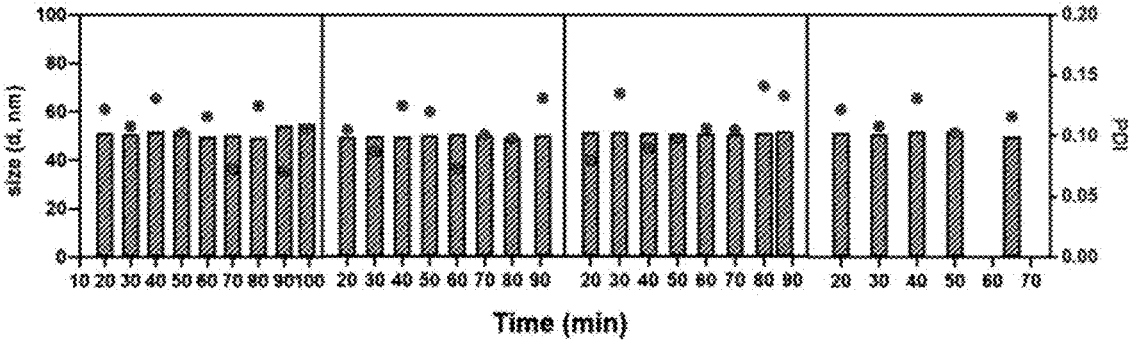
Figure 24F:
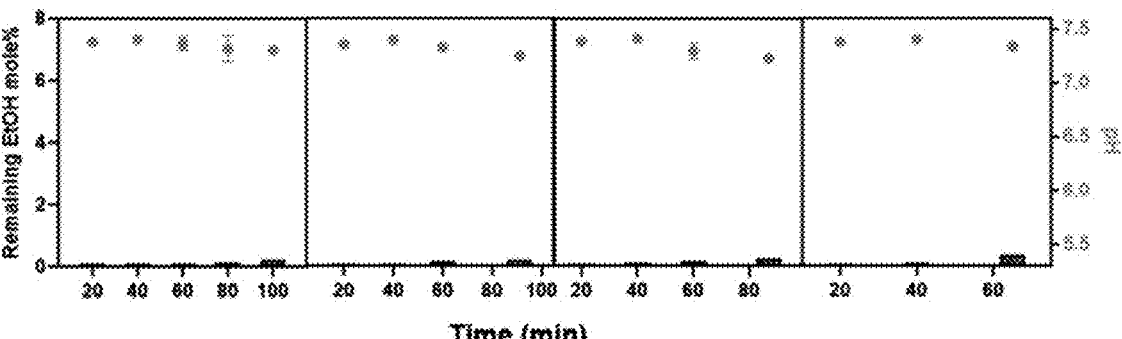
FIG. 24F illustrates the degree of ethanol removal and pH adjustment measured at 20 minute intervals.

An experiment was conducted to confirm the long-term operability of the MBI-8. First, the dual-drug loaded liposomes containing DOX and CCM were injected into MBI-8 at a flow rate of 50 μL min⁻¹ to remove unencapsulated drugs. After that, the absorbance was measured at 420 nm and 485 nm at intervals of 2 minutes using real-time UV-Vis after mixing the encapsulated DOX and CCM with methanol to expose them to the outside (FIG. 24A). In the first cycle, it was confirmed that the absorbance was maintained constant until 99 minutes, and then, the absorbance was increased because the unencapsulated drug was not smoothly removed due to the membrane fouling phenomenon. To reactivate the membrane, ethanol was flowed at a flow rate of 1 mL min⁻¹ for 3 minutes, and water was flowed at a flow rate of 1 mL min⁻¹ for 2 minutes. This process was repeated four times, and it was confirmed that in the fourth cycle, a 65-minute purification process was possible (FIGS. 24B and 24C). The absorbance information of FIG. 24B was converted into a concentration, and a drug (%) that has not been removed from the non-encapsulated drug was calculated (FIG. 24D). In addition, when the size and PDI value of the liposome were measured at 10-minute intervals, it was confirmed that they remained fairly stable (FIG. 24E), and high ethanol removal rate (<0.5%) and pH were also confirmed to reach the range of 7.2 to 7.4. (FIG. 24F).

The specific parts of the present disclosure have been described in detail, and it will be apparent to those skilled in the art that these specific descriptions are merely preferred embodiments, and the scope of the present disclosure is not limited thereto. Therefore, the substantial scope of the present disclosure is defined by the appended claims and their equivalents.

LIST OF REFERENCE SIGNS

1: microfluidic dialysis module
10: upper plate
11: fastening hole
111: head coupling portion
113: through portion
12: top surface of upper plate
13: upper flow path
131: upper flow path inlet
132: upper diffusion flow path
133: upper flow path outlet
134: upper connection flow path
14: bottom surface of upper plate
15: upper inlet
17: upper outlet
19: side surface of upper plate
20: lower plate
21: fastening hole
22: top surface of lower plate
23: lower flow path
231: lower flow path inlet
232: lower diffusion flow path
233: lower flow path outlet
24: bottom surface of lower plate 25: lower inlet
27: lower outlet
29: side surface of lower plate
30: membrane
40: fixing member
51: first fluid supply flow path
52: first fluid supply portion
53: first fluid discharge flow path
54: first fluid discharge portion
56: first fluid supply pipe
58: first fluid discharge pipe
61: second fluid supply flow path
62: second fluid supply portion
63: second fluid discharge flow path
64: second fluid discharge portion
66: second fluid supply pipe
68: second fluid discharge pipe

What is claimed is:

1. A microfluidic dialysis module capable of mass exchange between a first fluid and a second fluid, the microfluidic dialysis module comprising:

an upper plate having an upper flow path through which the first fluid flows therein formed on one surface thereof, and having an upper inlet through which the first fluid flows into the upper flow path and an upper outlet through which the first fluid flows out of the upper flow path formed on the other surface thereof;

a lower plate having a lower flow path through which the second fluid flows therein formed on one surface thereof, and having a plurality of lower inlets through which the second fluid flows into the lower flow path and a plurality of lower outlet through which the second fluid flows out of the lower flow path formed on the other surface thereof;

a membrane disposed between the one surface of the upper plate and the one surface of the lower plate and formed in a porous membrane structure; and a fixing member coupling the upper plate and the lower plate, wherein a direction in which the first fluid flows in the upper flow path and a direction in which the second fluid flows in the lower flow path are opposite to each other, wherein the upper flow path comprises an upper diffusion flow path extending while switching directions at least twice, and the lower flow path comprises a lower diffusion flow path extending while switching directions at least twice, wherein the lower flow path comprises a plurality of lower diffusion flow paths, and the plurality of lower diffusion flow paths are formed to be fluidly separated from each other.

2. The microfluidic dialysis module of claim 1, wherein the upper flow path comprises:

a plurality of upper diffusion flow paths and one or more upper connection flow paths respectively disposed between the plurality of upper diffusion flow paths to fluidly connect two adjacent upper diffusion flow paths.

3. The microfluidic dialysis module of claim 1, wherein the lower inlet and the lower outlet are formed in the same number as the number of lower diffusion flow paths, and the lower outlet is fluidly connected to one end of each of the lower diffusion flow paths, and the lower inlet is fluidly connected to the other end of each of the lower diffusion flow paths.

4. The microfluidic dialysis module of claim 1, wherein the positions on the one surface of the upper plate in which each of the upper diffusion flow paths are disposed correspond to the positions on the one surface of the lower plate in which each of the lower diffusion flow paths are disposed, and each lower diffusion flow path is located at positions facing each the upper diffusion flow path when the upper plate and the lower plate are coupled by the fixing member with the membrane interposed therebetween.

5. The microfluidic dialysis module of claim 1, wherein the upper flow path is formed such that one surface thereof is exposed on the one surface of the upper plate, and the lower flow path is formed such that one surface thereof is exposed on the one surface of the lower plate.

6. The microfluidic dialysis module of claim 1, wherein widths of the upper inlet and the upper outlet are formed to be wider than a width of the upper flow path, respectively, and the widths of the lower inlet and the lower outlet are formed to be wider than the width of the lower flow path, respectively.

7. The microfluidic dialysis module of claim 6, wherein the upper inlet and the upper outlet extend toward the one surface of the upper plate, and the upper flow path extends toward the other surface of the upper plate, so that the height direction end of the upper outlet and a height direction end of the upper inlet communicate with a height direction end of the upper flow path, respectively, and the lower inlet and the lower outlet extend toward the one surface of the lower plate, and the lower flow path extends toward the other surface of the lower plate, so that the height direction end of the lower outlet and a height direction end of the lower inlet communicate with a height direction end of the lower flow path, respectively.

8. The microfluidic dialysis module of claim 1, wherein the upper plate comprises one or more upper fastening hole formed by passing through the upper plate in a vertical direction, and the lower plate comprises one or more lower fastening hole formed by passing through the lower plate in the vertical direction, wherein the positions where the upper fastening hole is formed in the upper plate and the positions where the lower fastening hole is formed in the lower plate correspond to each other, so that the upper fastening hole and the lower fastening hole, which are located at the positions corresponding to each other, are penetrated and fastened together by the fixing member.

9. The microfluidic dialysis module of claim 8, wherein the upper fastening hole is formed by a plurality of holes spaced apart from each other along edges of the one surface and the other surface of the upper plate, and the lower fastening hole is formed by a plurality of holes spaced apart from each other along edges of the one surface and the other surface of the lower plate to correspond to positions where the upper fastening holes are formed.

10. The microfluidic dialysis module of claim 8, wherein the upper fastening holes are formed between the plurality of upper diffusion flow paths, respectively, and the lower fastening holes are formed between the plurality of lower diffusion flow paths, respectively.

11. A method for purifying a drug delivery system or biopharmaceuticals using the microfluidic dialysis module of claim 1.

12. The method of claim 11, wherein a solvent comprising the drug delivery system or biopharmaceutical is injected into the upper flow path and a buffer solution for dialysis is injected into the lower flow path, wherein a flow rate ratio (FRR) of the solvent comprising the drug delivery system or biopharmaceutical injected into the upper flow path and the buffer solution injected into the lower flow path is 1 to 32, and wherein the solvent comprising the drug delivery system or biopharmaceutical injected into the upper flow path is replaced with the buffer solution injected into the lower flow path through salt exchange between the flow of the solvent comprising the drug delivery system or biopharmaceutical injected into the upper flow path and the flow of the buffer solution injected into the lower flow path.

13. The method of claim 11, wherein the drug delivery system comprises a liposome, a lipid-based nanoparticle, a polymer-based nanoparticle, an inorganic-based nanoparticle or a protein nanoparticle and the biopharmaceutical comprises an enzyme, and wherein one or more impurities selected from the group consisting of alcohol solvents, unencapsulated drugs, nucleic acids and peptides are removed from the drug delivery system or biopharmaceutical.

14. The method of claim 11, wherein the method for purifying the drug delivery system or biopharmaceutical using the microfluidic dialysis module represents a recovery rate of the drug delivery system or biopharmaceutical of 95% or more, and wherein a pH of the solvent comprising the drug delivery system and biopharmaceutical purified by the method of purifying the drug delivery system or biopharmaceutical using the microfluidic dialysis module is 7.2 to 7.4.

15. The method of claim 11, wherein when the drug delivery system is a liposome or lipid-based nanoparticle, the drug delivery system purified by the method of purifying the drug delivery system using the microfluidic dialysis module maintains an initial encapsulation efficiency, initial particle size, and initial polydispersity index of the drug.

16. The method of claim 11, wherein the method for purifying the drug delivery system or biopharmaceutical using the microfluidic dialysis module reduces the use amount and purification time of a buffer solution for dialysis compared to a method for purifying the drug delivery system or biopharmaceutical using a batch dialysis or diafiltration, and wherein the method for purifying the drug delivery system using the microfluidic dialysis module exhibits at least one of the following properties a) to e) compared to a method for purifying the drug delivery system using a batch dialysis or diafiltration:

a) increase a production performance index defined by the product of a reciprocal of diameter of the drug delivery system particle and a polydispersity index value of the drug delivery system, b) decrease buffer solution usage, c) increase drug preservation capability, d) decrease purification time, and e) increase recovery rate of drug delivery system.

17. The drug delivery system purified by the method for purifying the drug delivery system or biopharmaceutical using the microfluidic dialysis module according to claim 11.

18. The drug delivery system of claim 17, wherein the drug delivery system is a dual-drug loaded liposome, a cationic liposome, a high concentration lipid nanoparticle, a polymer-based nanoparticle, an inorganic-based nanoparticle, or a protein-based nanoparticle, and wherein the drug delivery system has a higher cell uptake rate compared to the drug delivery system purified by batch dialysis or diafiltration and maintains an initial encapsulation efficiency, initial particle size, and initial polydispersity index of the drug even after an aging period.

\* \* \* \* \*